(12) United States Patent
McCabe, Jr. et al.

(10) Patent No.: US 12,017,212 B2
(45) Date of Patent: Jun. 25, 2024

(54) HIGH PRESSURE FLUIDIC DEVICES HAVING VOLUME INTEGRITY AND HOMOGENOUS FLOW

(71) Applicant: SPF Technologies LLC, Somerville, MA (US)

(72) Inventors: Theodore McCabe, Jr., Cambridge, MA (US); Gaston De Los Reyes, Somerville, MA (US); Amanda Lemire, Somerville, MA (US); Danielle Marquis, Cambridge, MA (US)

(73) Assignee: SPF TECHNOLOGIES LLC, Somerville, MA (US)

( * ) Notice: Subject to any disclaimer, the term of this patent is extended or adjusted under 35 U.S.C. 154(b) by 859 days.

(21) Appl. No.: 17/013,718

(22) Filed: Sep. 7, 2020

(65) Prior Publication Data

US 2021/0069704 A1 Mar. 11, 2021

Related U.S. Application Data

(60) Provisional application No. 62/897,369, filed on Sep. 8, 2019.

(51) Int. Cl.
| | |
|---|---|
| *B01L 3/00* | (2006.01) |
| *B29C 64/118* | (2017.01) |
| *B33Y 10/00* | (2015.01) |
| *B33Y 40/20* | (2020.01) |
| *B33Y 80/00* | (2015.01) |
| *B29L 31/14* | (2006.01) |

(52) U.S. Cl.
CPC ...... *B01L 3/502707* (2013.01); *B29C 64/118* (2017.08); *B33Y 10/00* (2014.12); *B33Y 40/20* (2020.01); *B33Y 80/00* (2014.12); *B01L 2200/06* (2013.01); *B01L 2200/12* (2013.01); *B29L 2031/14* (2013.01)

(58) Field of Classification Search
CPC ........ B33Y 10/00; B33Y 40/20; B29C 64/118
See application file for complete search history.

(56) References Cited

U.S. PATENT DOCUMENTS

| | | | | |
|---|---|---|---|---|
| 2014/0099351 | A1* | 4/2014 | Adams | B33Y 10/00 264/401 |
| 2017/0259189 | A1* | 9/2017 | de Los Reyes | B01D 15/22 |
| 2017/0350259 | A1* | 12/2017 | Dutta | F01D 5/187 |

* cited by examiner

*Primary Examiner* — Nathan T Leong
(74) *Attorney, Agent, or Firm* — Barry Gaiman

(57) ABSTRACT

A fluidic device includes an impermeable base, single-strand walls coupled to the impermeable plate. The single-strand walls include a plurality of loops, each loop has a lower part of a double wedge and an upper part of a double wedge aligned with the lower part of the double wedge. The device also includes a lattice connected to the single-strand wall with a loop-as-wipe connection and a gabbled roof disposed opposite the impermeable base and coupled to the tops of the single-strand walls.

8 Claims, 20 Drawing Sheets

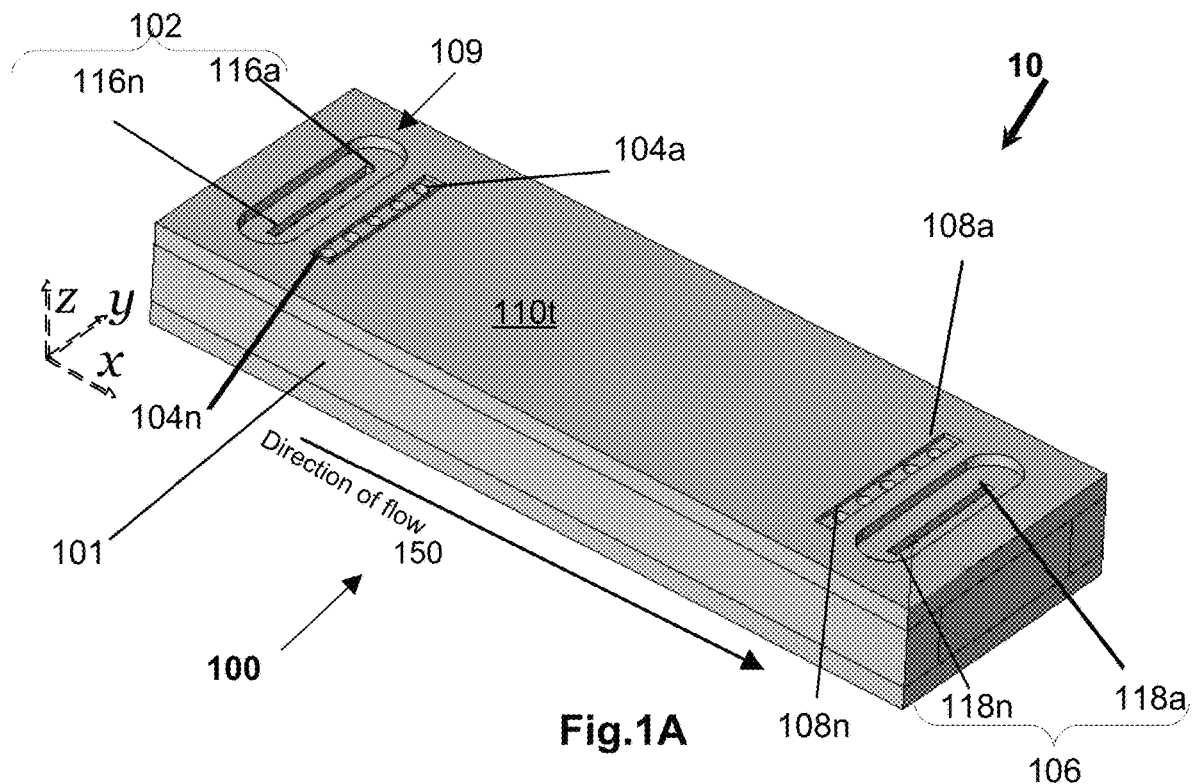
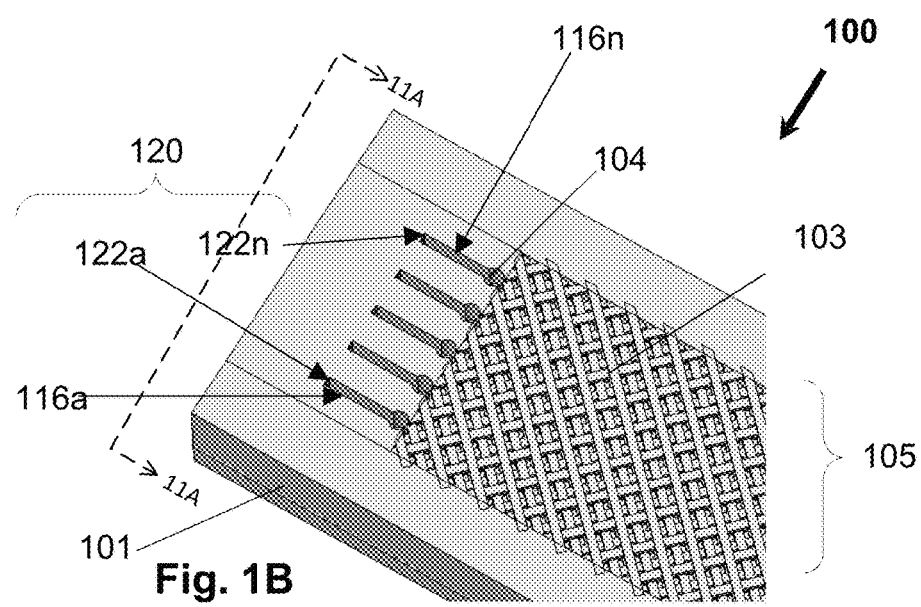

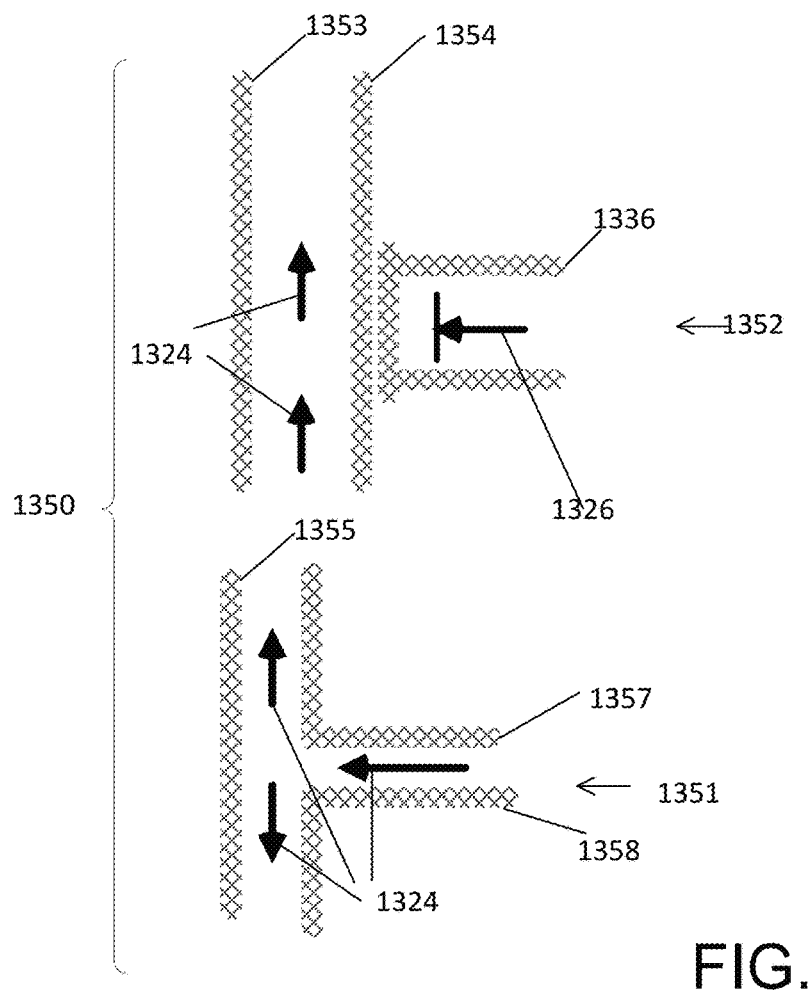
FIG. 13D
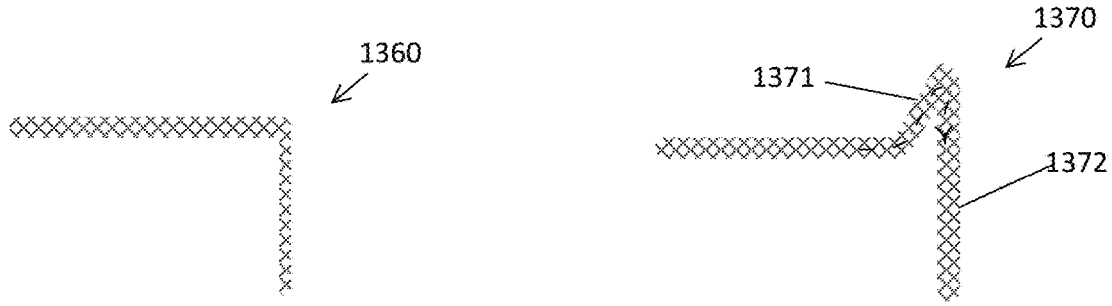
FIG. 13E
FIG. 13F

HIGH PRESSURE FLUIDIC DEVICES HAVING VOLUME INTEGRITY AND HOMOGENOUS FLOW

RELATED APPLICATIONS

This application claims the benefit of U.S. Provisional Application No. 62/897,369 entitled HIGH PRESSURE FLUIDIC DEVICES HAVING VOLUME INTEGRITY AND HOMOGENOUS FLOW, filed Sep. 8, 2019, and is related to U.S. application Ser. No. 16/543,655, entitled STACKABLE PLANAR ADSORPTIVE DEVICES, filed Aug. 19, 2019, which applications are hereby incorporated herein by reference in their entireties.

TECHNICAL FIELD

The field of this invention is related generally to the fields of additive manufacturing (AM), commonly known as 3-D printing and more particularly to the field of fused filament fabrication (FFF), also referred to as fused deposition modeling (FDM). More specifically, embodiments disclosed herein relate to additive manufacturing techniques related to the production of devices which handle high pressure liquid flows and seek to minimize flow bypass and leakage, for example, in chromatography cassettes.

BACKGROUND OF THE INVENTION

Conventional chromatographic devices require that beads be packed into a column. The quality of this packing determines the performance of the adsorptive bed. This process adds another source of variability to the chromatographic process and must be validated before use. Furthermore, beds packed with beads are prone to voiding, a phenomenon whereby the beads settle into a denser structure resulting in the creation of voids and in non-homogeneities in the packing density of the bed, all of which results in a deterioration of performance.

Fluid bypass and dead zones occur in fluidic devices produced using an additive process or similar process which uses sequential layers or strands. In many fluidic devices, specifically chromatograph cassettes, fluid bypass and dead zones are considered undesirable and signifiers of poor performance. In some fluidic devices, bypass can negatively affect chromatographic performance.

In 3D printed chromatography cassettes problems occur when 3D printed boundaries fail to provide good Loop Integrity which is related to fluid volume integrity and is described below in further detail. These problems are caused by several issues including:
1) A printed path that has a shape/cross section that fails to precisely fill an ideal path design cross section. This issue, referred to herein as Bypass, creates fluid leakage and/or bypass between adjacent portions of printed path(s).
2) The start and end points of a printed path are printed poorly and/or are inaccurately aligned to the rest of the print path. This issue, referred to herein as Loop Integrity addresses the lack of integrity which creates leakage around either end of the path. Even if the ends are printed accurately, Bypass prevents the ends from joining well enough for good Loop Integrity. 3D printed fluidic devices with either of these issues generally fail to print fluidic devices with sufficient Loop Integrity even with careful choice of uniformly printed paths.

With conventional 3D print slicers and 3D design software, it is difficult to use additive manufacturing to make an integral (non-leaking) pressure vessel having high performance flow paths using an additive process, or similar manufacturing processes involving sequential layers or strands. It is also difficult to 3D print a thin impermeable plate used as a base or top (also referred to as a roof).

Conventional 3D-printing strategies only allow a printing head to move along a printing plane in the direction away from the printed plane (referred to as the Z axis), never towards it. A conventional technique to 3D-print an integral plate involves printing a thick plate of many layers. This multi-layer plate allows fluid to seep into the first few layers where a chromatographic stationary phase cannot reach and additionally has fluid bypass issues. This is unsuitable for applications where the fluid flow path must be tightly controlled.

SUMMARY

For certain fluidic devices it is difficult or impossible to fabricate an internal structure (e.g., a chromatographic lattice) using conventional manufacturing techniques. When 3D printing such a device issues related to fluid impermeability (surface integrity), fluid bypass and strength need to be addressed. The following techniques described below, Double wedge, Sealing Strand, Single-Strand Walls, Pinched Distributor/Gabled Roof, and Loop as Wipe. As used in various combinations, these techniques achieve good surface integrity for surfaces within a single print layer, achieve good Loop Integrity at the interface between a loop and the bounded region of a surface, and ensure that printed paths that might suffer an integral defect are accessible to further treatments or coatings without the further treatments also causing bypass or leakage. Specifically, the Loop as Wipe technique is used to minimize bypass.

An additive manufacturing method is provided herein for fabricating a device, the method includes printing an impermeable plate, printing an impermeable sidewall coupled to the impermeable plate and attaching an internal structure to the impermeable sidewall. The impermeable plate is either an impermeable base or an impermeable top or both. Such a technique provides devices which have Loop Integrity (i.e., are fluidly integral) with minimum bypass. A technique for printing an impermeable plate includes printing a first layer having a first plurality of strand segments and a top surface, each of the first plurality of strand segments is spaced apart from an adjacent one of the first plurality of strand segments forming a plurality of gaps, printing a second layer having a second plurality of strand segments, each of the second plurality of strand segments printed at least partially below the top surface of the first layer in a corresponding one of the plurality of gaps and wherein the second layer at least partially seals the plurality of gaps.

In another technique, printing an impermeable sidewall includes extruding a filament to form at least a portion of a loop of the fabricated device including a lower portion of a double wedge; and extruding the filament to form at least a portion of a loop of the fabricated device including an upper portion of the double wedge aligned with the lower portion of the double wedge. A further technique includes extruding the filament in a single-strand and sealing the impermeable sidewall using a hybrid process In another technique, the internal structure comprises a lattice structure and the technique further includes attaching the lattice structure to the impermeable sidewall using a loop-as-wipe connection. In a further technique attaching the internal structure to the impermeable sidewall includes varying an extruder speed and E-rate and the internal structure is a lattice structure. In another embodiment, printing an impermeable plate and printing an impermeable sidewall includes 3D printing.

Another technique includes printing a distributor to provide at least one flow path into and out of a volume defined by the impermeable base, the impermeable sidewall, and a roof, and in which the at least one flow path is in fluid communication with the internal structure. The distributor which in certain embodiments is a pinched distributor is printed as a single strand per layer.

A fluidic device according to one embodiment, includes an impermeable base, a plurality of single-strand walls, each having bottom surfaces coupled to the impermeable base, the plurality of single-strand walls includes a plurality of loops, each loop including a lower part of a double wedge and an upper part of a double wedge aligned with the lower part of the double wedge. The fluidic device further includes an internal structure connected to the single-strand wall with a loop-as-wipe connection and an impermeable roof disposed opposite the impermeable base and coupled to top surfaces of the single-strand walls. Such a device has Loop Integrity (i.e., is fluidly integral) with minimum bypass. In other embodiments the internal structure is a lattice structure and the single-strand walls can be sealed, In another embodiment, the fluidic device further includes a distributor to provide at least one flow path into and out of a volume defined by the impermeable base, the plurality of single-strand walls forming a sidewall, and the impermeable roof and the at least one flow path is in fluid communication with the internal structure. The fluidic device in certain embodiments can further include a distributor coupled to the internal structure, for example, the distributor can be a pinched distributor and the pinched distributor can include at least one gutter and at least one gable.

An additive manufacturing method for fabricating a device is provided, the method including printing an impermeable sidewall including extruding a filament to form at least a portion of a loop of the fabricated device including a lower portion of a double wedge, and extruding a filament to form at least a portion of a loop of the fabricated device including an upper portion of the double wedge aligned with the lower portion of the double wedge.

Yet another additive manufacturing method for fabricating a device includes printing an impermeable plate by printing a first layer having a plurality of strand segments and a top surface, and spacing apart each of the plurality of strand segment from an adjacent strand segment forming a plurality of gaps and printing a second layer having a second plurality of strand segments, each of the second plurality of strand segments of the second layer printed at least partially below the top surface of the first layer in a corresponding one of the plurality of gaps and the second layer at least partially seals the plurality of gaps.

In still another technique provided herein, an additive manufacturing method for fabricating a device includes printing an internal structure within a volume defined by an impermeable base, an impermeable sidewall, and a impermeable roof and printing a distributor to provide at least one flow path into and out of the internal structure, and the distributor can be a pinched distributor having a plurality of layers and printed as a single strand per layer.

Other secondary processes (e.g., machining, including CNC machining) are used to fabricate features with a higher resolution than possible with FDM printing. The combination of FDM printing, sealing, and machining (referred to as a Hybrid FDM printing process) can produce an impervious cassette with features that allow stackability and the desired chromatographic performance. One embodiment for printing an impermeable plate includes printing a structure with a shell built from layers of single-strand thickness. Carefully constructing a single-strand shell fluid structure which is integral greatly reduces the possibility of bypass or dead zones within the flow paths. The single-strand structure can optionally be used with a secondary "sealing" operation, which increases the chance of creating an integral vessel, while maintaining little to no chance of creating a bypass or dead zone.

Chromatography cassettes described herein include Chromassettes® manufactured by SPF Technologies, LLC of Somerville, Massachusetts. The need to create structures that have minimal leakage/bypass may exist in other areas/fields (e.g. medical devices, plumbing) that use additive manufacturing, and these techniques provided herein would be applicable in those area and fields as well. It is understood that use of a wiping technique (i.e. loop-as-wipe) can be used to attach an internal structure which differs in shape from a lattice structure.

BRIEF DESCRIPTION OF DRAWINGS

The foregoing and other aspects, embodiments, objects, features and advantages of the present teachings can be more fully understood from the following description in conjunction with the accompanying drawings. In the drawings, like reference characters generally refer to like features and structural elements throughout the various figures. The drawings are not necessarily to scale, emphasis instead being placed upon illustrating the principles of the present teachings. The following drawings are illustrative of embodiments of the invention and are not meant to limit the scope of the invention as encompassed by the claims.

FIG. 1A is a view of a stackable chromatography cassette;

FIG. 1B is a view of a lattice and distribution network for a stackable chromatography cassette;

FIGS. 13A-13D are schematic diagrams of the details of the pinched distributor of FIG. 12;

FIG. 13E is a diagram of an ideal print path; and

FIG. 13F is a schematic diagram of an approximation of an actual 3D printed corner according to an aspect of the invention.

DETAILED DESCRIPTION OF THE INVENTION

Conventional software Slicers can produce structures to satisfy arbitrary flow paths, but do not do so while also providing good integrity to surfaces. Certain embodiments described herein, use directly generated G-code to control the 3D printing process without the use of slicer software. Embodiments disclosed herein generally relate to devices and processes suitable for high pressure fluidic devices having volume integrity and homogenous flow as disclosed in the following structures and techniques.

A distributor, as referred to herein, is generally a collection of multiple flow paths for some fluid/gas from one volume region (the source) to another volume region (the exit). The features of the paths are determined by the specific application/device.

An "integral volume," as referred to herein, is generally a 3D volume within a printed part that has very little or no leakage (possibly after a minimal external treatment) from inside the volume to outside the volume and vice-versa.

One problem with 3D printing of fluidic devices is the difficulty in producing near ideal results when attempting to include a fluidic distributor with maximal volume integrity, and no internal/undesirable flow bypasses. If there are multiple exits and/or sources, but only one flow path connecting one to another, then this problem is partially solved by printing a loop around the whole region using a single strand and using the double wedge technique as described below in more detail. The specific geometries of the flow paths depend on the individual requirements of the printed device which can affect the requirements on the distributor. In certain embodiments, multiple distributors can be chained as needed (e.g., to chain cassettes), with an exit functioning as the source for the next distributor or with exits and sources coupled in parallel (e.g., to stack cassettes in parallel). Various techniques are described below in conjunction with the FIGS. 1A-13C.

Figure 1C:
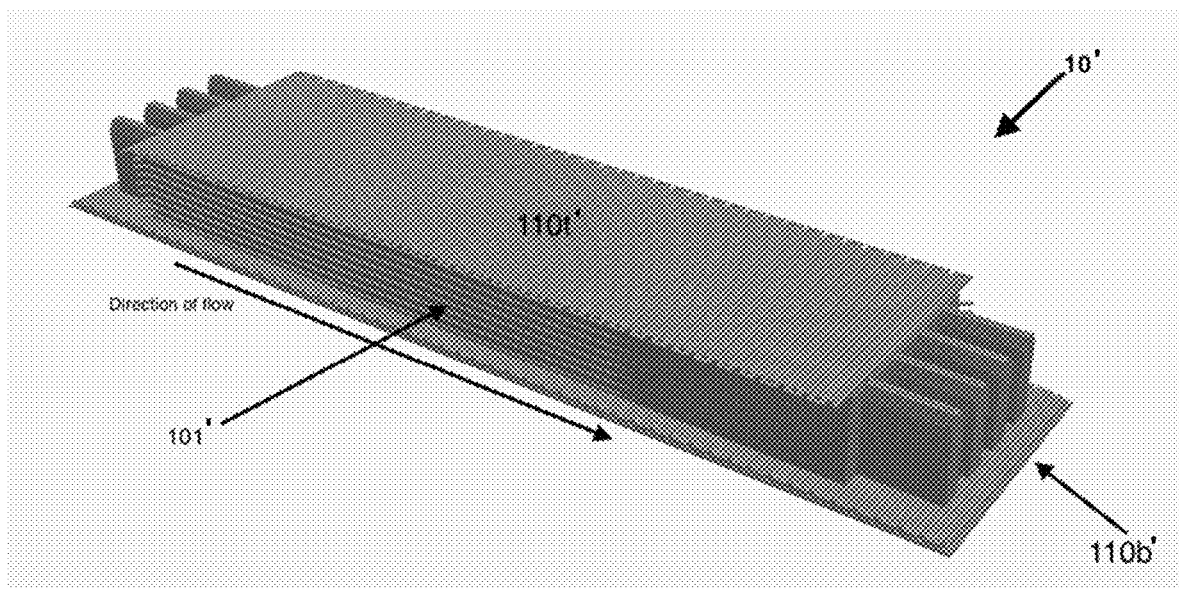
FIG. 1C is a view of a stackable chromatography cassette according to an aspect of the invention.

Referring now to FIG. 1A, the lattice and distribution network 100 includes first internal distribution network 102 including first internal distribution channels 116a-116n (collectively a first internal distribution channels 116) and second internal distribution network 106 including second internal distribution channels 118a-118n (collectively first internal distribution channels 118). The stackable cassette 10 provides access to the distribution channels 116 and 118 through the top plate 110t (FIG. 1C) to provide distribution of feed stream and collection of eluent stream, respectively. The cassette 10 lattice and distribution network 100 further includes passageways 104a-104n (collectively passageways 104) with access from the top plate 110t to accept packing retainers (not shown) on the feed end. The second internal distribution network 106 of the cassette 10 further includes passageways 108a-108n (collectively passageways 108) with access from top plate 110t to accept packing retainers (not shown) on the eluent end. In this embodiment packing retainers are cylindrical porous rods having a circular cross-section with a diameter approximately equal to the diameter of passageways 104 and 108. Once inserted, the packing retainers are sealed and remain in place. Packing retainers having geometries and or different from a circle are possible. Cassette 10 also includes o-ring well 109 which with an o-ring or other sealing mechanism seals the cassette 10 to a holder and also seals adjacent cassettes to each other when stacking multiple cassettes.

Now, referring to FIG. 1B, the exemplary lattice and distribution network 100 for a stackable chromatography cassette 10 of FIG. 1A includes the peripheral seal 101 (FIG. 1C), and at least one screen 103 forming a lattice 105 surrounded by the peripheral seal 101. The lattice and distribution network 100 further includes the first internal distribution network 102 and a second internal distribution network 106 (FIG. 1A) fluidly coupled to the lattice and surrounded by the peripheral seal 101. The first internal distribution network 102 and the second internal distribution network 106 are connected through the top plate 110t and bottom plate 110b (both in FIG. 1C) to provide distribution of feed stream and collection of eluent stream, respectively. In this embodiment the first internal distribution network 102 and the second internal distribution network 106 also form a pass through distribution network 120 having channels 122a-122n, affecting distribution between cassettes and thereby enabling the stacking of the cassettes.

Now, referring to FIG. 1C, an exemplary stackable cassette 10' (similar to cassette 10 of FIGS. 1A and 1B) includes an exemplary lattice and distribution network 100' for a stackable chromatography cassette which includes a peripheral seal 101'. The stackable cassette 10 further includes a top plate 110t' and a bottom plate 110b' on the opposite side of top plate. In one embodiment, the bottom plate 110b' is disposed opposite the top plate 110t' and a lattice (not shown) is disposed between the top and bottom plates and is surrounded on four sides by the peripheral seal 110t'. Cassette 10' including the distribution network 100' and peripheral seal 101' can be made using the techniques described below.

Double Wedge

The double wedge is a printed structure used to prevent the formation of voids created at the starting point or the end point of a strand. A double wedge enables the printing of integral or nearly integral walls (i.e. walls that are impervious and without leakage) which are essential in the printing of a fluidic device which is used with fluid under pressure. It is understood that a double wedge can be used to join two different strands printed in a single layer in addition to printing a single continuous strand in a single printing layer as described below in FIG. 2.

Now referring to FIG. 2 a double wedge 200 includes two wedges, bottom wedge 210 immediately below top wedge 212. Bottom wedge 210 is started at point 202 having a thickness much smaller than the layer thickness, with the thickness gradually increasing as the strand is laid down until it reaches the layer thickness. The amount of material being extruded per linear displacement of the printing head hereafter, E-rate, gradually increases while the printing head additionally moves up (in the z-direction) and away from a base layer (the layer upon which the new strand is being laid). A difference between E-rate and extrusion rate is that E-rate equals amount of material being extruded per unit length of travel of the print head (i.e., the Δ material/Δ length derivative) while extrusion rate equals the amount of material being extruded per unit time (i.e., the Δ material/Δ time derivative). The bottom wedge 210 is finished when the printing head reaches point 206; thereafter the E-rate remains constant, and the strand being printed then has a uniform thickness. When the print head reaches point 202, above the start of the bottom wedge, the E-rate starts to decrease in a manner such that the combined strand thickness is slightly larger than the portion of the strand with uniform E-rate, until it reaches point 206, where the strand and the double wedge 200 both terminate. This process, including varying the E-rate and increasing thickness at certain points improves Loop Integrity.

Figure 2:
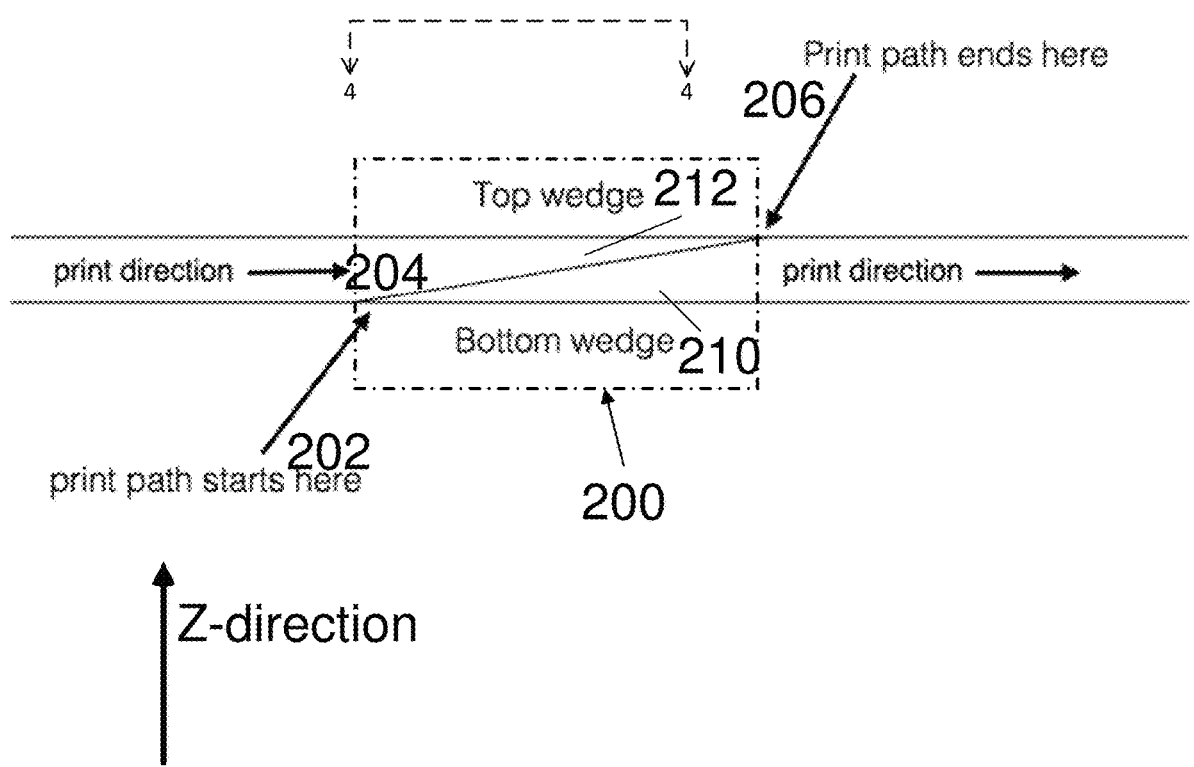
FIG. 2 is a side view schematic diagram of a double wedge printed loop according to an aspect of the invention.

In some embodiments the double wedge has a straight interface between the bottom wedge 210 and top wedge 212 as shown in FIG. 2. In other embodiments that interface may have a sawtooth shape, wherein the change in z-value occurs in discrete steps rather than in smooth, continuous steps. In still another embodiment, the interface may be smooth but not a straight line as shown in FIG. 2. The specific embodiment chosen depends on the capabilities of the printing device, but the end goal is to approximate the ideal wedge as shown.

Also depending on the specifics of the printing device, in some embodiments the print head moves at a constant speed during the printing of the double wedge 200, and the amount of material being extruded per unit time, the E-rate increases in order to print the bottom wedge 210, and vice-versa to print the top wedge 212. In other embodiments the E-rate remains constant, requiring the speed of the print head to start high and gradually decrease to print the bottom wedge 210, and vice-versa to increase the print head speed to print the top wedge 212.

The slope of the wedges 210 and 212 forming the double wedge 200, defined as the height of the layer divided by the length of the double wedge, may vary. In some embodiments the slope of a wedge is about 0.03 to about 0.1; in other embodiments the slope may be as low as 0.005 or as large as 0.3. The slope may be dictated by the z-height resolution of the FDM printer, the properties of the filament and the amount of space available to print the double wedge. In some embodiments, this slope is approximately 0.045.

Figure 3:
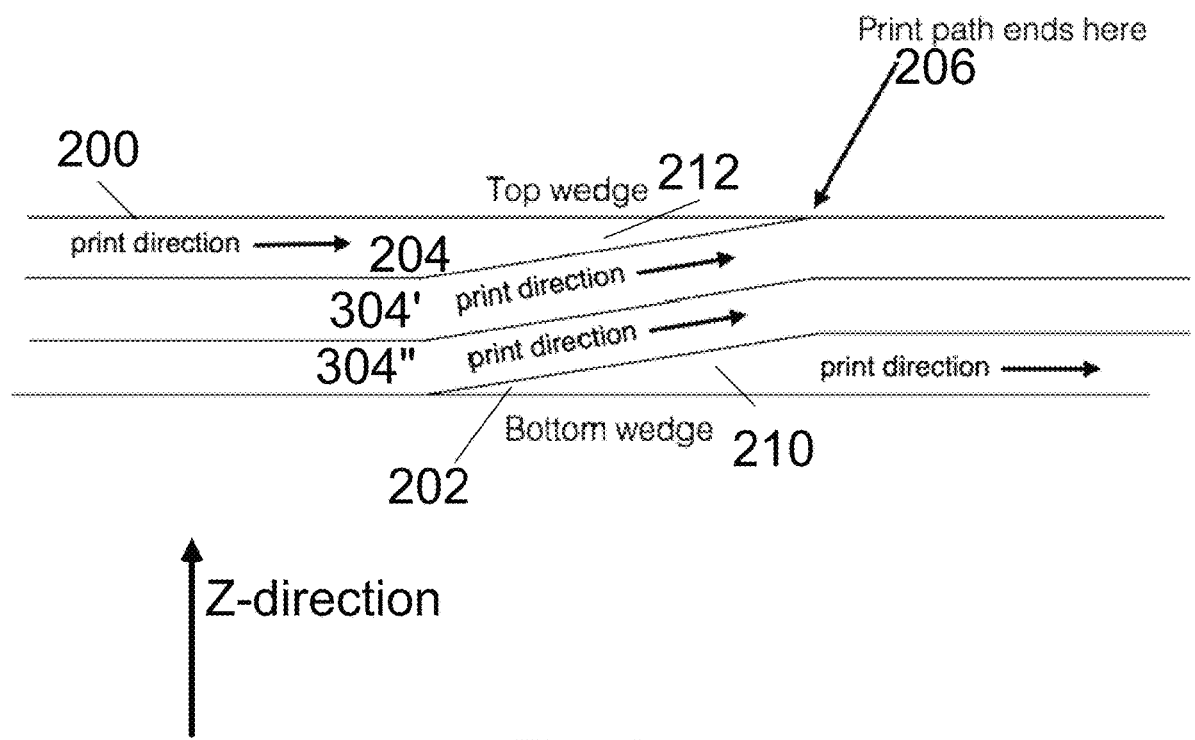
FIG. 3 is a side view schematic diagram of a multi-layer wedge printed loop according to an aspect of the invention.

Now referring to FIG. 3, where like reference numbers refer to like structures in FIG. 2, in some embodiments additional layers can be printed between the bottom wedge 210 and the top wedge 212 before the top wedge 212 is finally printed. In these embodiments strands 304" and 304' are printed above the bottom wedge 210 by moving the print head in the z-direction with the E-rate remaining constant. The bottom wedge 210 is printed in the layer corresponding to strand 304", when the print head returns to above point 202 instead of printing a top wedge 212, the print head moves in the z-direction to follow the profile of the bottom wedge while maintaining a constant E-rate. In this embodiment strand 304" gradually changes in z-dimension to become strand 304', in effect creating a ramp as the print head moves from point 202, the start of bottom wedge 210 in strand 304", to point 206, the end of bottom wedge 210 in strand 304". This ramping up of the print head, synchronized to occur at the location of bottom wedge 210 in strand 304", can be repeated in subsequent layers thereby printing additional strands such as strand 304' and subsequent ones as desired. At a certain layer the top wedge 212 is printed to complete the printing of an impervious wall with the printing of strand 204. In some embodiments synchronization-and-stacking is used so that the entire impervious wall has a single bottom wedge 210 and a single top wedge 212 thereby forming a single synchronization-and-stacking segment. In other embodiments the finished wall has multiple synchronization-and-stacking segments.

Some FDM printers may not be accurate enough to reliably execute the synchronization-and-stacking method such that the ramping up of the print head occurs reliably at the location of the bottom wedge in strand 204. For that reason or reasons related to other properties of a specific printer configuration, in some embodiments a double wedge is printed at every layer, without using any stacking. In still some embodiments the double wedge may be printed at different locations to prevent small imperfections in an already printed double wedge to propagate into subsequent double wedges at new layers. In some embodiments an additional strand segment may be printed ahead of the double wedge.

It is understood, that the shorter the length of the lead-in 306 the faster the printing, though this time difference may be negligible in practice; on the other hand the larger the length of the lead-in 306 the lower the risk of printing imperfections invading the double wedge and impairing integrity. Also, if the path segment the wedge is placed within is convex, relative to the interior, then a suitable location for the start of the lead-in is the start of said path segment (thus placing any extrusion surplus from the start of the strand on an outside corner). So in some embodiments, the lead-in starts at the corner as just mentioned, while in other embodiments it starts several segments previous in the closed loop path (always tracing just outside the loop's path), perhaps as far as all the way around the loop. In other embodiments, the lead-in starts a fixed distance along the path before the bottom wedge. For this distance, a dimensionless length of a segment is defined as the length of that segment divided by the wedge length. In some embodiments the dimensionless length of the lead-in is about 3 to about 14, in other embodiments the dimensionless length of the lead-in is about 20 to about 30. In yet other embodiments, if could be as low as 0.5 or as large as 200. Defining the displacement distance as the actual distance divided by the strand width, in some embodiments displacement 301 is about 0.2 to about 0.6, in other embodiments displacement 301 can be as low as 0.1 and as large as 0.9.

Figure 4:
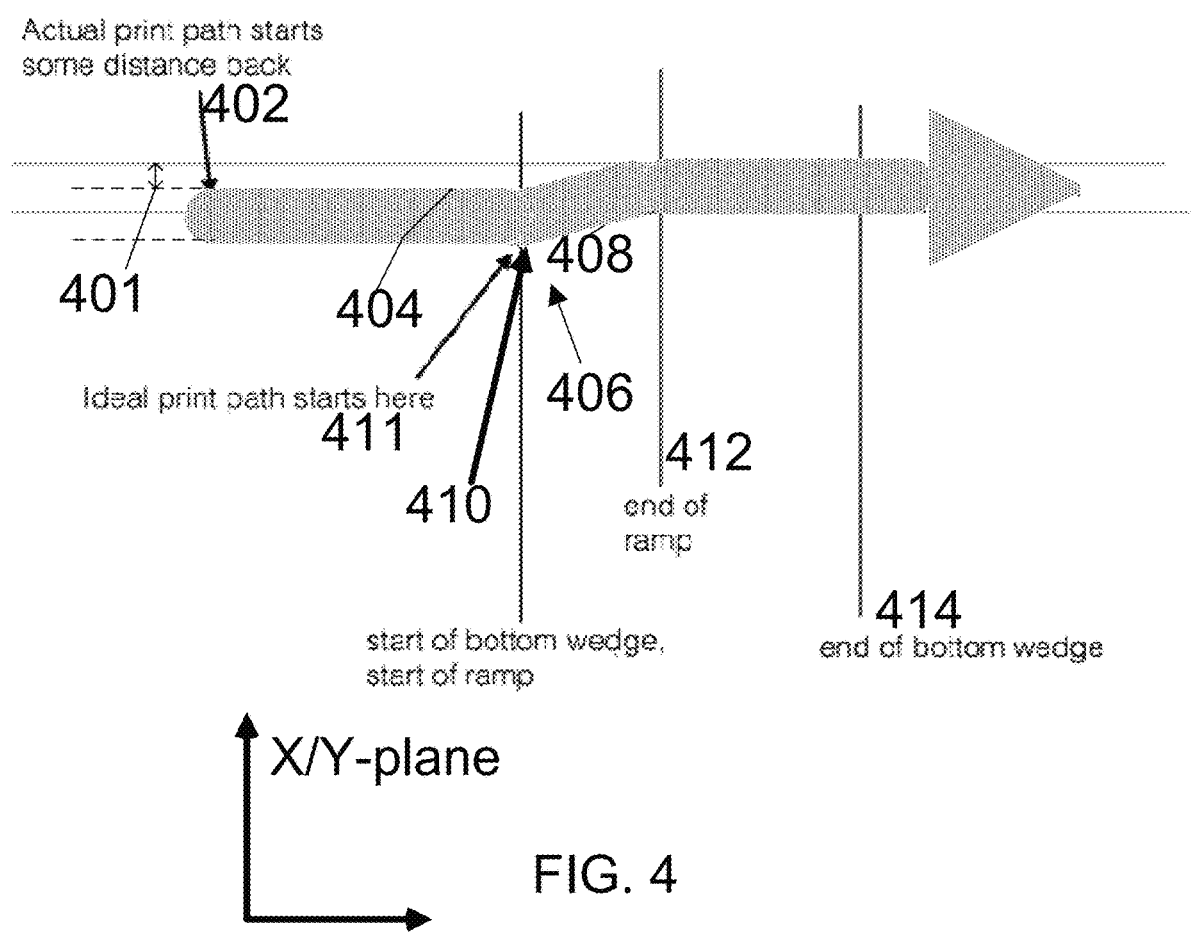
FIG. 4 is a top view schematic diagram of cross sectional views (along section 4A-4A) of the printed loop of FIG. 2.

Referring now to FIG. 4, lead-in strand segment 402 (hereafter lead-in 402) precedes the bottom wedge 410 and is further displaced in the x/y-plane from the design path followed by the base strand with displacement 401. Lead-in 402 starts ahead of bottom wedge 410, at base layer 404 and attached to it by printing it with interference with base layer 404. At point 411, the start of bottom wedge 410, print head simultaneously moves up in z-value (deposition height) and sideways in x/y-plane creating ramp 408. Along the ramp 408 the strand both grows in size and slides into alignment with the design path thereby starting bottom wedge 410. Ramp 408 ends at point 412 when print head is aligned with design path; thereafter the E-rate of the print head continues to increase as described earlier to complete bottom wedge 410. In some embodiments, the height of lead-in 402 may differ slightly (e.g., 1/10 of the layer height) from the initial height of the bottom wedge, either above or below, dependent upon the configuration of the strands upon which the lead-in and bottom wedge are printed. The printing of the lead-in 402 and its displacement from the design path may improve integrity of the double wedge by excluding from the double wedge the imperfections that may occur whenever a new strand is started. Generally in embodiments disclosed herein, a printed loop is effectively a single strand. It is noted that a double wedge technique can be used without a loop. For example, a strand with a bottom wedge may be started and that particular strand may be ended at a previously printed strand at that layer (e.g., a strand that intersects the path of the strand being printed), and eventually another strand that ends at the bottom wedge is printed, at which point the corresponding top wedge is printed to form a double wedge.

Single-Strand Walls

Fluidic devices requiring high performance in laboratory or similar applications with strand based additive technologies requires solving the problems described herein. One technique to manufacture a 3D printed pressure vessel is to use a multi-strand thick vessel wall. The increased number of vessel walls increases the chance the vessel will remain integral. However voids and imperfections in the multi-strand wall provide opportunity for bypass and dead zones in the fluid flow. As described below, one solution is to use single-strand walls.

Figure 5A:
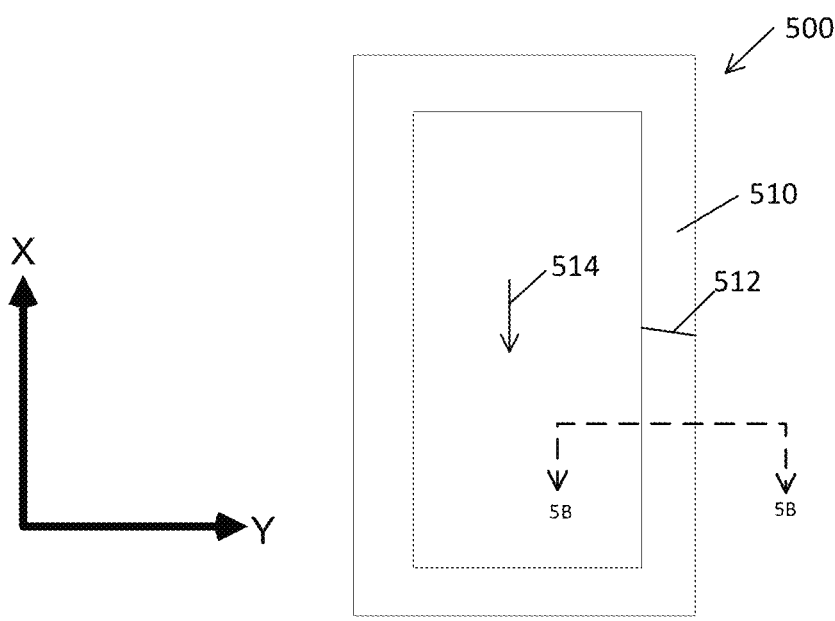
FIG. 5A is a schematic diagram of a top view of single-strand walls according to an aspect of the invention.
Figure 5B:
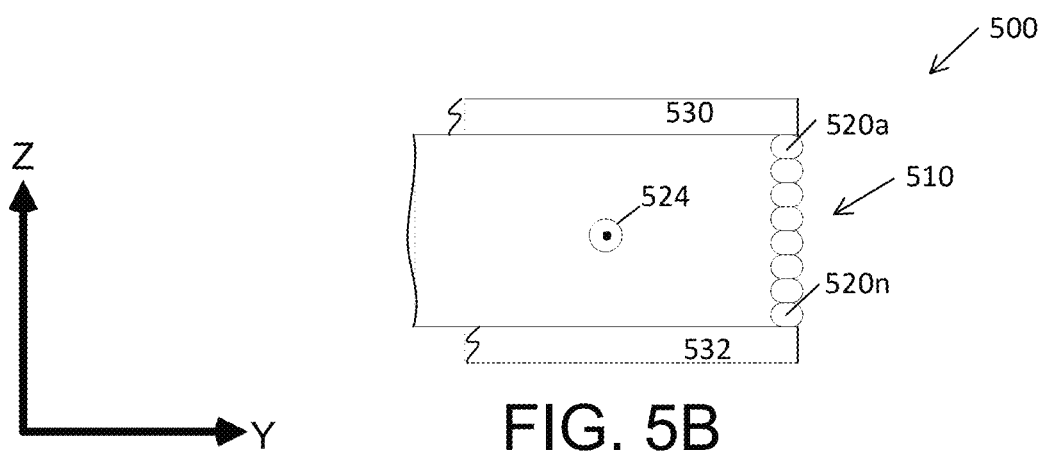
FIG. 5B is a schematic diagram of a cross sectional view (along section 5B-5B) of the single-strand wall of FIG. 5A.

FIGS. 5A and 5B are diagrams of single-strand walls.

There are a few elements which constitute a careful and effective design of a single-strand fluid shell structure:

(1) Inherently the single-strand shell, when integral, has no flow bypass region in the wall because the strand itself is solid. If the shell leaks at the fusion region between shells then it will be not integral as opposed to finding a bypass.
(2) The single-strand wall minimizes the "interfaces" between the start and end of a layer or strand to maximize taking advantage of the inherent solid structure of the strand itself.
(3) The strand shell should have minimal staggering such that dead volumes are created.
(4) The strand direction should be chosen cognizant of the fluid effects. The strand valleys create very slight preferential flow paths which can be arranged perpendicular or parallel to flow paths depending on the desired effect.

It is desirable to use less material to print a more effective fluid shell. In order to make a leak tight fluid structure the current paradigm is to use multi-strand thickness walls as in FIG. 5C. The total structure may be leak tight due to the many redundant walls but if the first layer isn't leak tight then a fluid volume forms such as in void 570 between strand 540a and strand 542a in FIG. 5. This volume represents an opportunity for bypass or a dead volume. When a high performance flow path is required the bypass or dead volumes created by the multi-strand feature cannot be tolerated. The well-designed single-strand fluid structure prevents them. It has the additional benefit of using less material and taking less time to print.

Now referring to FIGS. 5A and 5B, an exemplary cassette 500 (also referred to as fluidic device 500) includes a sidewall 510 formed by a plurality of single-strands 520a-520n (FIG. 5B). Arrow 514 represents the liquid flow direction through the cassette 500. The start and stop point of the strand is indicated by line 512. The Double Wedge described above helps with the quality of 512. Now referring to FIG. 5B, the cassette 500 includes a top plate 530 and a bottom plate 532 connected together by the sidewall 510. The top and bottom plate characteristics are detailed below in conjunction with FIGS. 7A-7C. Arrow point 524 represents the liquid flow direction through the cassette 500 (out of the page) and parallel to the sidewall 510. Using the double wedge and single strand wall techniques, it is possible to fabricate sidewall 510 as an impermeable sidewall which can be further sealed using a hybrid process described below.

Figure 5C:
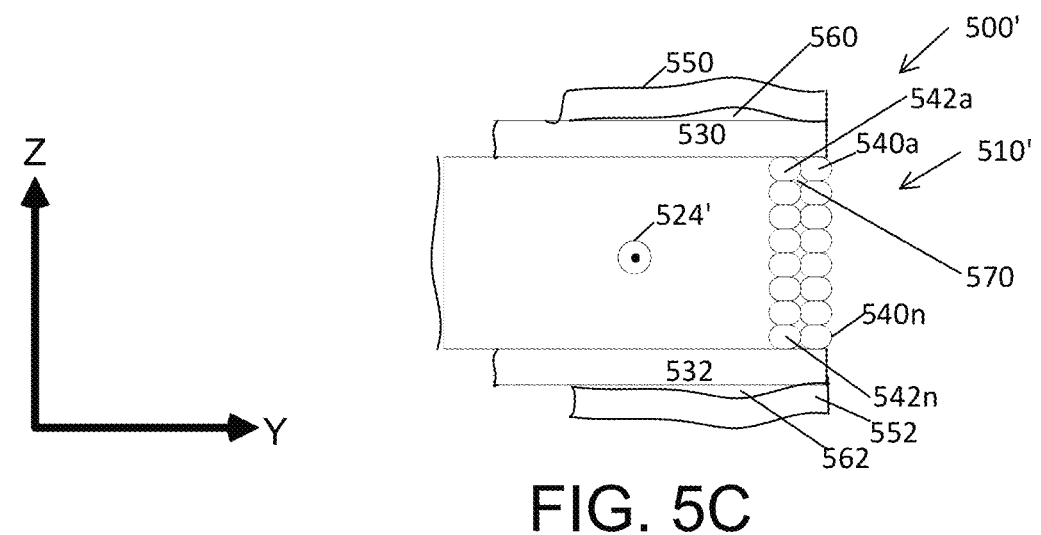
FIG. 5C is a diagram of a multi-strand wall.
Figure 6:
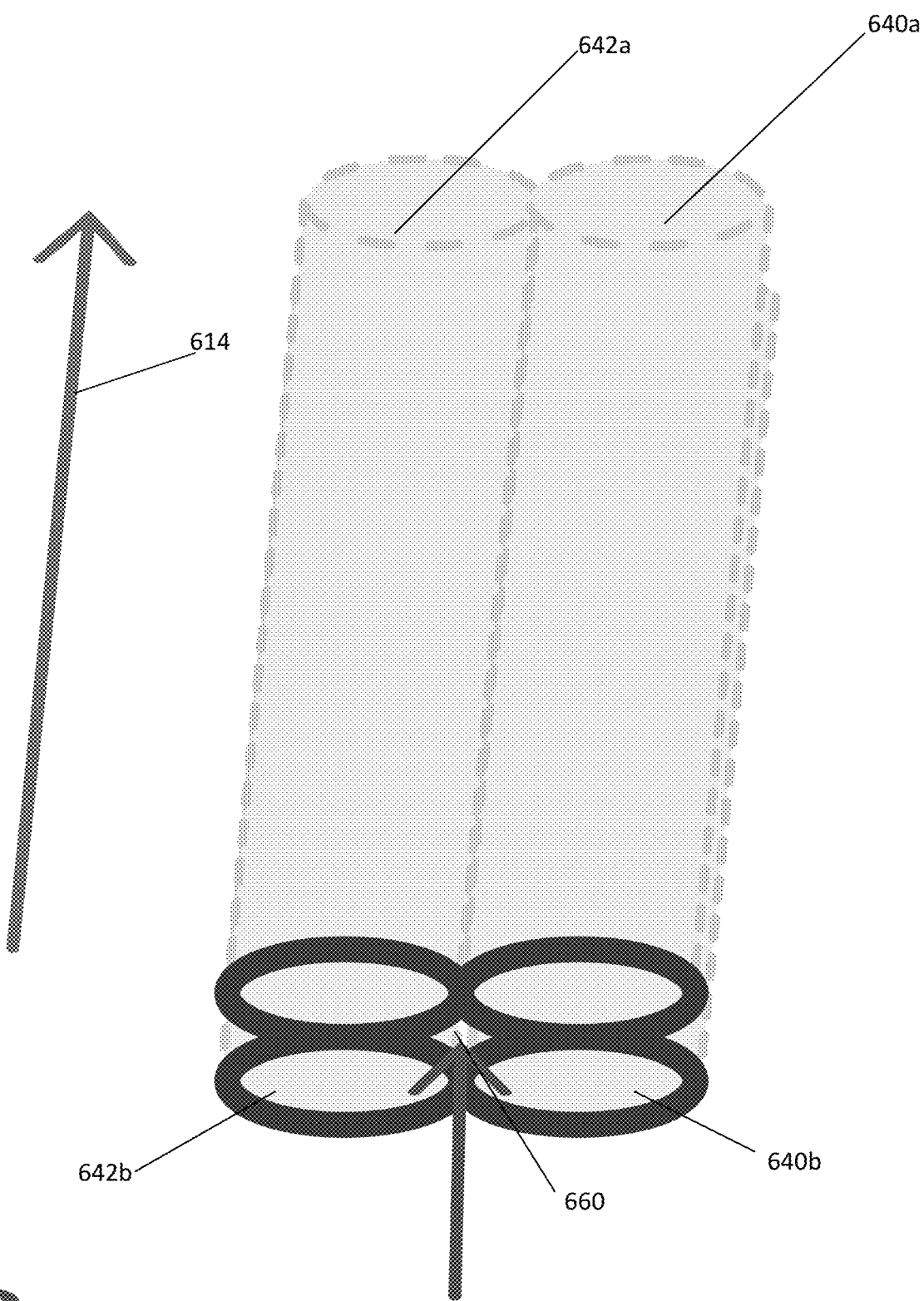
FIG. 6 is a diagram of a bypass zone formed by voids created between adjacent strands.

FIG. 5C is a diagram of a multi-strand wall and FIG. 6 is a diagram of a bypass zone. These figures further show the bypass problem in more detail. Now referring to FIG. 5C, for clarity an inferior design using the conventional multi-strand approach to achieving integrity is shown. Cassette 500', similar to cassette 500 of FIG. 5A, includes a sidewall 510' formed by a plurality of single-strands 540a-540n disposed adjacent a second plurality of single-strands 542a-542n. Arrow point 524' represents the liquid flow direction through the cassette 500' (out of the page) and parallel to the sidewall 510'. Cassette 500' includes a second strand 550 on the top plate 530. Here, a bypass 560 is shown to illustrate potential printing problems. Cassette 500' includes a second strand 552 on the bottom plate 532. Here, a bypass 562 is shown to illustrate another potential printing problem.

Now referring to FIG. 6, a bypass 660 (also referred to as or dead zone 660) similar to void 570 in FIG. 5C, is shown for the exemplary cassette 500' of FIG. 5C. The image is viewed from above, and it illustrates further detail of the void 570 in FIG. 5C. Since voids can create bypass, ideally, a print would be oriented so that there are no voids in the direction of flow, however this is not usually possible, so the goal is to minimize the number of voids, not necessarily eliminate them entirely.

Embodiments disclosed herein enable strand based additive technology to be used to fabricate high performance fluid structures. When creating a single-strand feature the fusion from one layer or strand to the next must be solid. The integrity of the overall device relies on the integrity of the fusion unless a second post-process sealing operation is used. The second post-process sealing operation is part of a Hybrid-FDM process which works well with the single-strand feature.

Impermeable Plates

Sealing Strand Technique

Figure 7A:
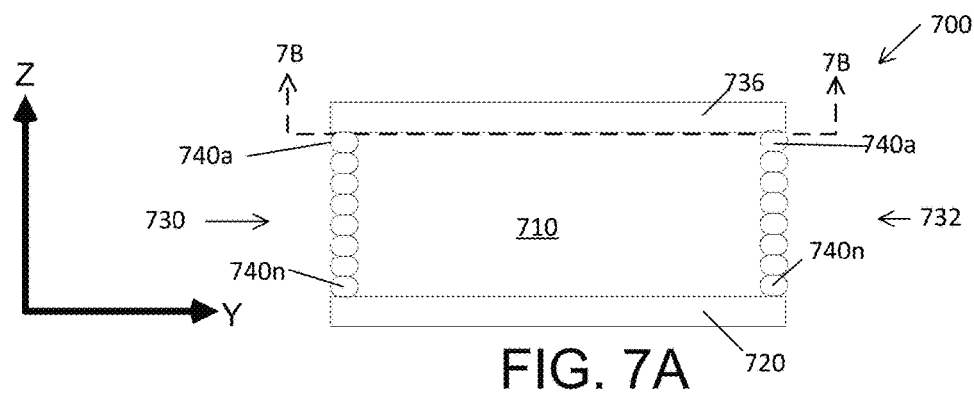
FIG. 7A is a diagram of single-strand features for fluid device according to an aspect of the invention.
Figure 7B:
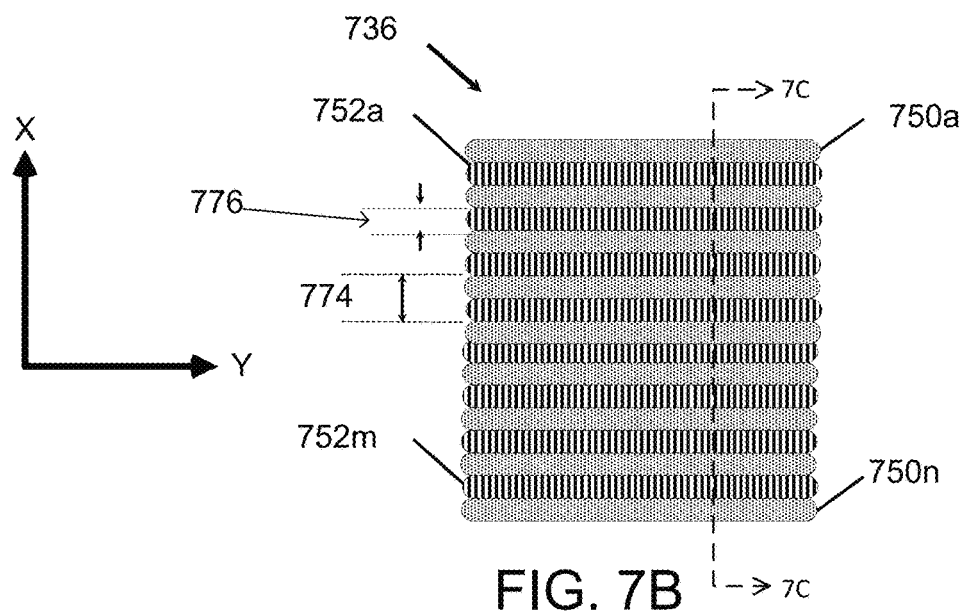
FIG. 7B is a schematic diagram of a top view (along section 7B-7B) of the single-strand impermeable plate of FIG. 7A showing first and second sets of strands.
Figure 7C:
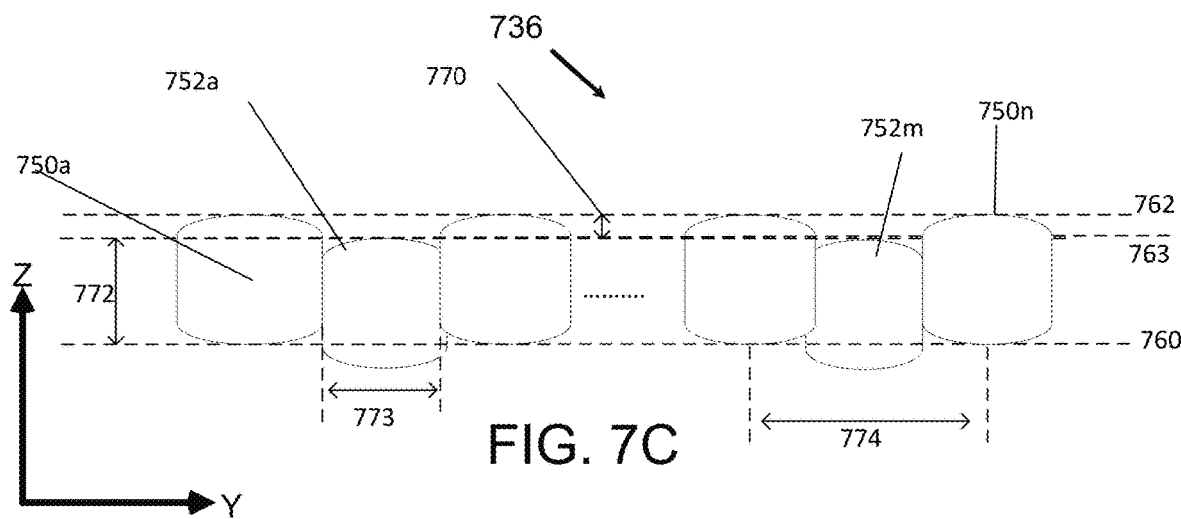
FIG. 7C is a schematic diagram of a cross sectional view (along section 7C-7C) of the gap filled single-strand roof of FIG. 7B.

The Sealing Strand Technique used to create impermeable plates and resulting structure is illustrated in FIGS. 7A-7C and 8A-8C. FIGS. 7A-7C are diagrams of single-strand features for fluid devices including impermeable plates. Now referring to FIG. 7A, cassette 700 includes an impermeable roof 736 and an impermeable base 720. Cassette 700 further includes sidewalls 730 and 732 formed from strands 740a-740n. Cassette 700 further includes an impermeable base 720 coupled to the sidewalls 730 and 732 and an impermeable roof 736 also coupled to the sidewalls 730 and 732. A properly designed impermeable plate will reduce or prevent the formation of voids between strand segments that lead to fluid leakage.

Now referring to FIG. 7B, a top view of the single-strand roof is shown. An impermeable roof 736 (and similarly an impermeable base 720) are printed using a Sealing-Strand technique. According to this method, an impermeable plate comprises two kind of strand segments, a first set of strand segments 750a-750n (referred to generally as strand segments 750), and a second set of strand segments 752a-752m, (referred to generally as sealing strand segments 752). Strand segments 750 are printed in a spaced-apart manner leaving gaps 776 (shown already filled in) between strand segments 750. It should be understood that strand segments 750 require a sub-layer of support strands to enable them to be printed without undue sagging. In the case of cassette

700, the impermeable base that forms the floor is coupled to an internal structure (e.g., a lattice) and the impermeable plate that forms the impermeable roof is supported by the internal structure (e.g., a lattice) that fills the interior of chamber 710 (FIG. 7A) (also referred to as volume or integral volume). Once the first set of strand segments 750 are printed, sealing strand segments 752 are printed to completely and reliably fill gaps 776 left between first set of strand segments 750.

Referring now to FIG. 7C, impermeable roof 736 includes strand segments 750*a*-750*n* (generally referred to as strand segments 750 in a first printed layer) and strand segments 752*a*-752*m* (generally referred to as strand segments 752 in a second printed layer or sealing layer) where a top of the sealing layer is indicated by line 763. A distance between the top of a first printed layer line 762 and the top of the second printed layer line 763 is shown as arrow 770 and indicates how far down in a Z direction the sealing layer is printed. A distance between strand segments 750 is indicated by arrow 774 and the height of the top of the sealing layer from the bottom of the first printed layer is indicated by arrow 772. A width of a sealing layer strand segment 752 is indicated by arrow 773.

Line 762 indicates a top of the first printed layer and would be the bottom of the second printed layer if the second printed layer were printed with conventional 3D printing techniques. Here the additional sealing layer includes segments 752*a*-752*n* which are actually printed at or below line 762. In one embodiment, distance 770, is about 0.03 mm, distance between strand segments 750 indicated by arrow 774 is about 0.72 mm and height 772 is about 0.32 mm. These distances are configurable printing parameters that can vary according to printer resolution, type of filament used and other design features. It is noted that this type of structure could not be printed using conventional 3D printing software. Here in one embodiment, the 3D printer instructions are generated by custom software which directly outputs G-code instructions from a model describing the cassette.

In one embodiment the E-rate of the sealing strand segments 752 is approximately the same as that of the strand segments 750, such that the sealing strand segments are narrower than and protrude below the strand segments 750. In some embodiments sealing strand segments 752 are printed at the same z-height as strand segments 750. In other embodiments, as shown in FIG. 7C, sealing strand segments 752 are printed at a z-height lower than that used to print the strand segments 750. In still other embodiments sealing strand segments 752 are printed at a z-height higher than that used to print the strand segments 750. In an integral fluidic device, the choice of relative height between the strand segments 750 and sealing strand segments is based on having a top surface of the impermeable base or the bottom surface of the impermeable roof) be as flat as possible as to not interfere with the desired flow characteristics or functionality of the fluidic device.

It is noted that this type of structure could not be printed using conventional 3D printing software. Here in one embodiment, the 3D printer instructions are generated by custom software which directly outputs G-code instructions from a model describing the cassette. An objective of the Sealing-Strand method is to reliably fill the gap between base strands and thereby obtain an integral plate. It should be further understood that the speed of the print head, the E-rate and the height of the print head are adjustable, and for some applications these should be adjusted to obtain both an integral plate and a smooth interior surface of the plate.

Figure 8A:
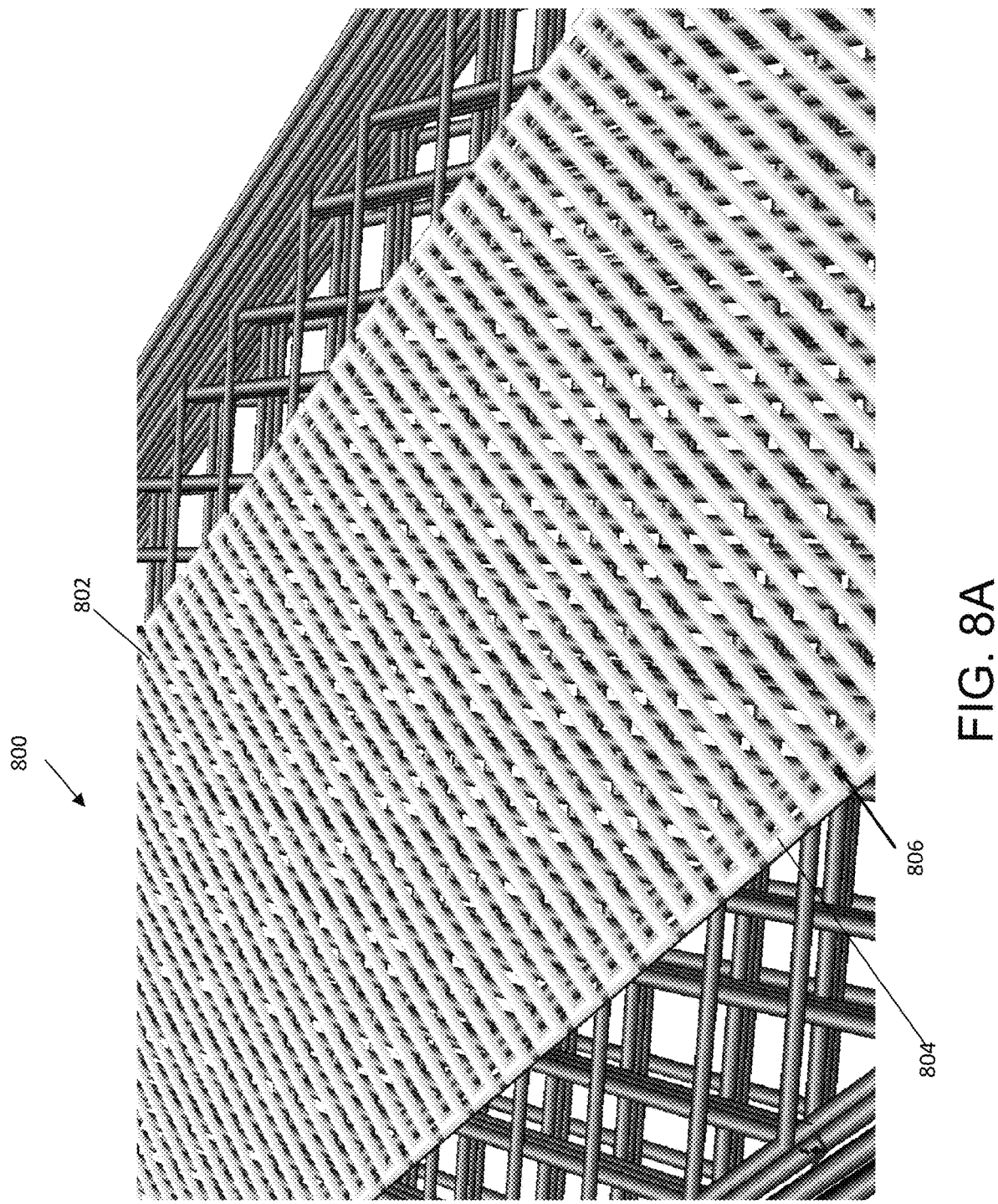
FIGS. 8A-8C are diagrams of the printed impermeable plate according to an aspect of the invention.
Figure 8B:
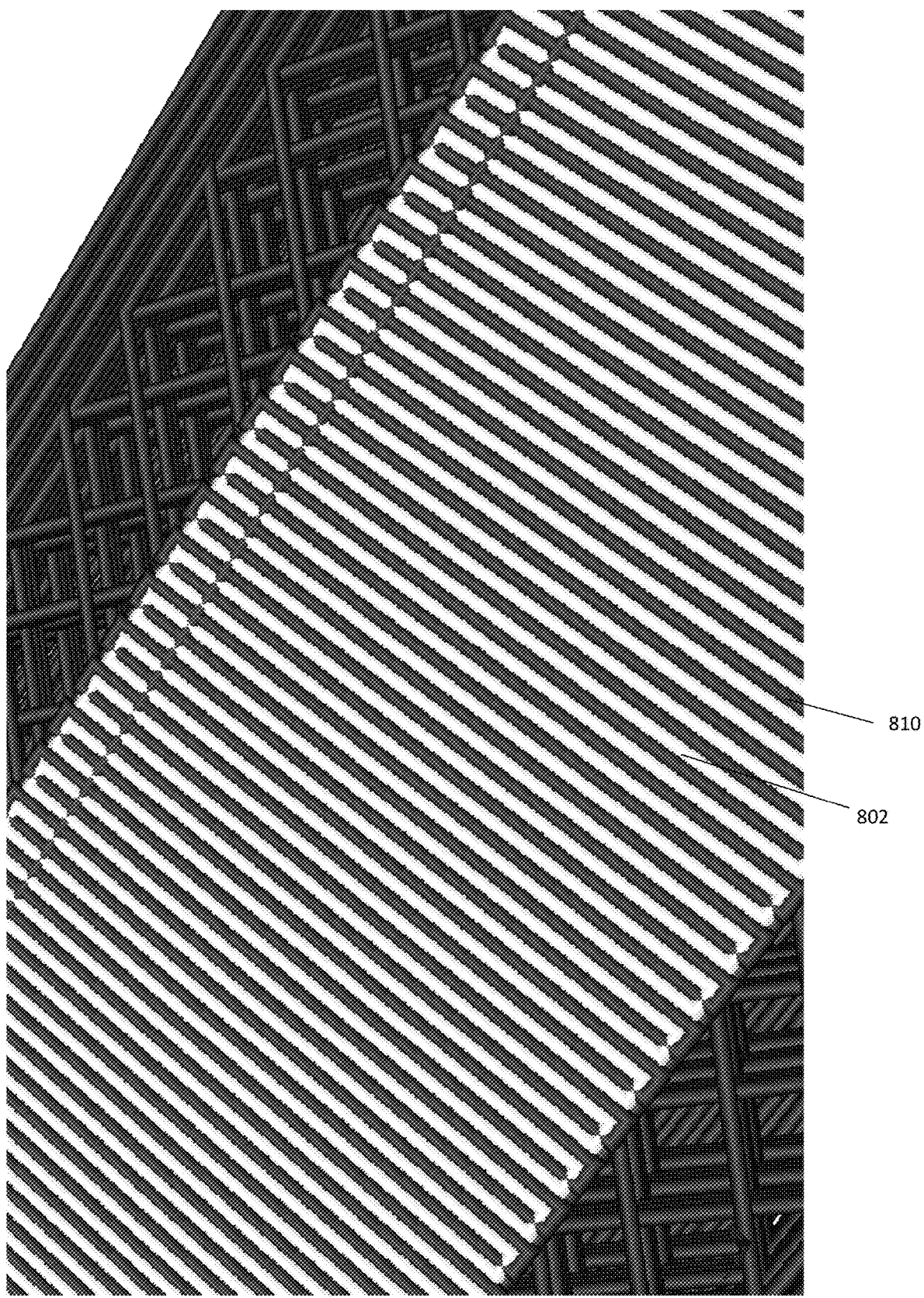
Figure 8C:
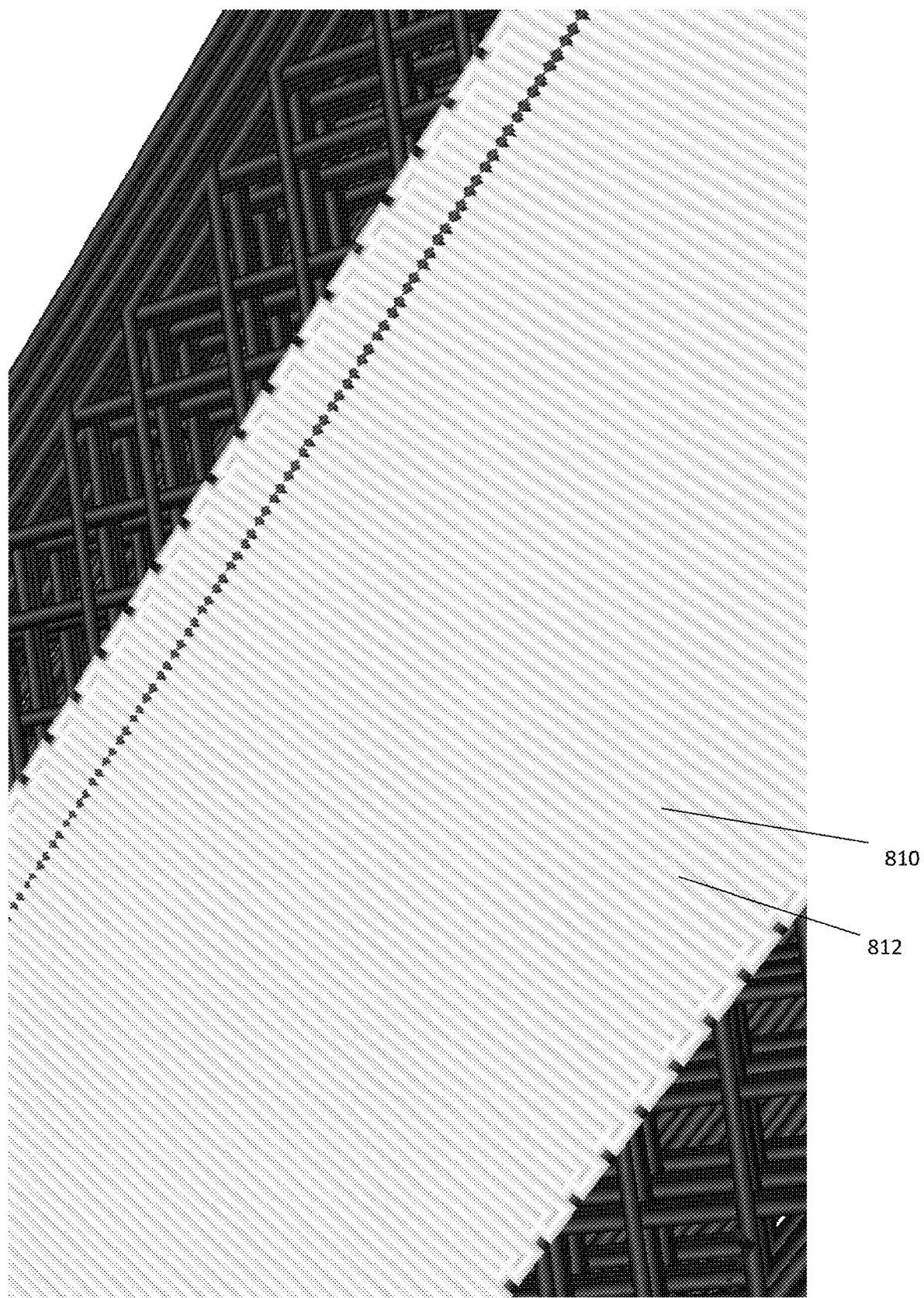

FIGS. 8A-8C are diagrams of a printed impermeable plate 800, similar to printed impermeable plate 736, here impermeable roof 736, shown in FIG. 7A, which could be either a top or bottom plate. A 3D-printing technique to create an impermeable plate with similar benefits of the single strand wall (no space for dead zones or bypass) includes printing a plurality of spaced apart strand segments generally parallel) creating a corresponding plurality of gap, then filling the plurality of gaps with a strand segments printed below top surface of the first strand. This is done by stepping the 3D printer extruder down towards the strand along the normal of the plate surface and printing a second sealing strand at an offset perpendicular to the strand within the plane of the plate surface as shown for strands 752*a*-*m* in FIG. 7C. Now referring to FIG. 8A, cassette impermeable plate 800 includes a first path printed at a desired layer height, and is comprised of a plurality strand segments 802 (750*a*-*n* in FIG. 7C) connected by tight turns 804. In one embodiment the plurality strand segments 802 are generally parallel and are part of a single continuous printed strand. The spacing between strand segments 802 is generally slightly less than a strand width forming a plurality of gaps 806.

Now referring to FIG. 8B, a second plurality of strand segments 810 (also referred to as sealing strand) is printed to fill in the gaps 806 between strands segments 802. The printed sealing strand segments are printed, in one embodiment, at a layer height below a surface at which a conventional lacer would print above the base layer 802 as shown above in conjunction with FIG. 7C. The second plurality of strand segments 810 are printed into the gaps 806 sealing the gaps in the base layer formed by strand segments 802. The position of the sealing layer depends on an approximation of the height of any voids that would occur were the initial strand segments 802. The second plurality of strand segments 810 can optionally have different strand thickness so as to effectively fill the gaps 806 without creating new voids. This can be achieved with a decreased material deposition rate or an increased path velocity, or some combination thereof. The result is something similar to a single integral layer with a layer thickness between one and two printer layers also referred to as (Z) increments. In one embodiment the combined layer thickness is about 1.1 printer layers, where the addition layer height is about 0.03 mm and the sealing layer can be lower than the base layer. It is understood that the effective layer height can be tuned for different materials and printers, and the parameters are selected to achieve integrity of the plate. FIG. 7C shows an example cross-section of the impermeable plate atop and below the additive manufactured device. The initial layers formed from strands segments 750*a* though 750*n* (each of corresponding to strand segments 802) are completed before the sealing stand segments 752*a* through 752*n* (corresponding to strand segments 810) are deposited. The result is integral with minimized bypass or dead zones. In one embodiment, the overlap of the layers is minimized to keep the sides of the two layers from lifting up from one another and potentially creating voids along the edges.

Loop-as-Wipe

Figure 9:
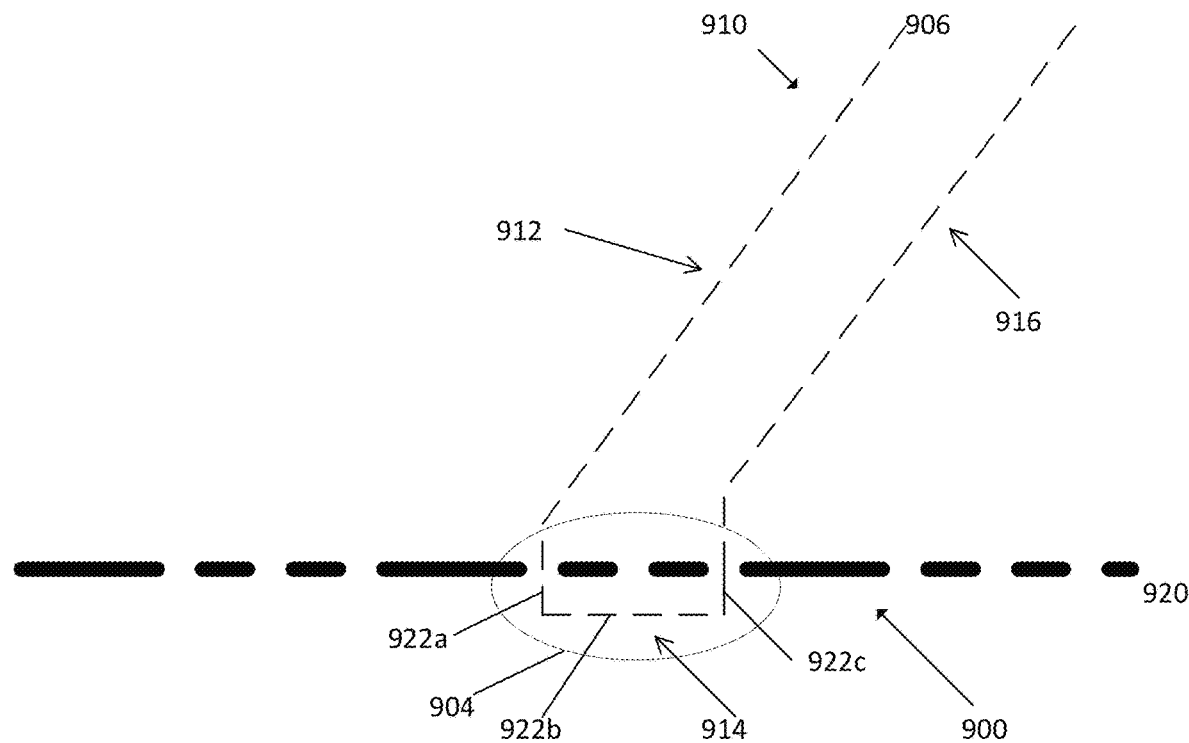
FIG. 9 is a schematic diagram of a loop-as-wipe according to an aspect of the invention.
Figure 10:
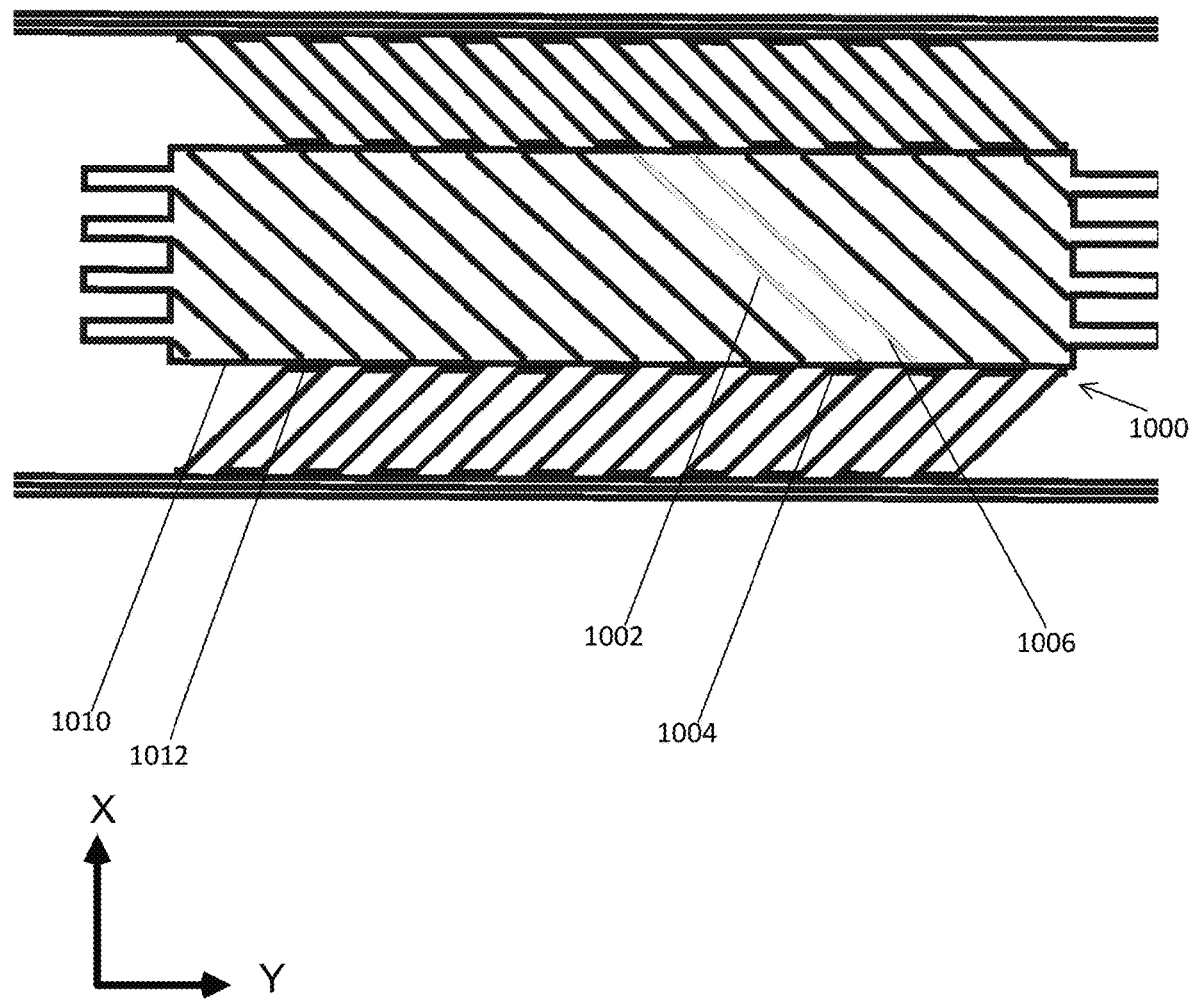
FIG. 10 is a schematic diagram of a loop-as-wipe according to an aspect of the invention.

FIGS. 9 and 10 are schematic diagrams of structures produced by a loop-as-wipe technique. Printed structures within an integral volume can create bypass, either due to several adjacent print strands meeting to create the bypass among them, or due to print strands that adjoin an integral surface. Even though bypass is entirely within the integral volume, it is undesirable. When printing high pressure fluidic devices some 3D-printer problems can occur including:

(1) printer filament extrudes with some inertia, which can make rapid changes in density of extrusion hard;
(2) within some surfaces, the presence of extremely narrow channels creates bypass, which is detrimental to the operating performance of a device; and
(3) narrow channels form in parallel with adjacent print lines. Adjacent lines are designed with an assumed rectangular cross-section, but in reality any given strand has a rounded cross-section. When strands are laid next to one another, small regions along the length of the paths are left unfilled by filament, as shown in FIG. 6.

Internal structures require that both ends of a given print line be supported by the integral surface that defines the functional volume. If internal print lines receive support by continuing in short print sections adjacent to the integral surface, many small bypass channels will be created inside the functional volume. One solution is to stop extruding (or even retract the filament) at the end of each print line, and move to the start of the next print line. Due to filament inertia, this solution can frequently result in undersized line starts (which are weak) and over-extrusion at the line ends (which create irregularities). Filament inertia is difficult to correct for as it varies between printers, and even between filament types and nozzle sizes.

Now referring to FIG. 9, a loop-as-wipe structure 910 is shown. An existing printed sidewall strand segment 900 along path 920 (sidewall strand segment 900 shown as dotted line along a sidewall similar to sidewall 1010 in FIG. 10) is the support for a printed strand segment 906 along the path of strand segments (912-914-916) disposed within a cassette such that minimal dead area is created at the interface 904 and that a layer can be printed on top of sidewall strand segment 900 with no interference from the supported strand (i.e., the loop-as-wipe structure, namely the three strand segments 922a-922c between strand segments 912 and 916, are small enough that they don't interfere with the printing of the next layer's strand on top of sidewall strand segment 900. In other words, the supported strand segment would be 912 and 916, with the supports being the three strand segments 922a-922c in between.

The printed strand segment starts at strand segment 912 and approaches printed sidewall strand segment 900 (also referred to as sidewall segment), it then passes along path of sidewall strand segment 900 with a slightly offset printed strand segment 914, such that the strand segment 906 makes a solid connection, then pulls away from sidewall segment 900, using extrusion settings so as to create very little additional deposit where the new strand segment 906 overlaps the earlier printed sidewall strand segment 900.

In one embodiment to achieve this, strand segment 912 approaches existing sidewall segment 900 at a relatively slow speed. Then the printed strand steps slightly across the existing sidewall strand segment 900, which is at the same layer height at a much faster speed. The strand segment 906 then is printed very quickly includes printed strand segments 914 along sidewall strand segment 900. The strand segments 922a-922c are printed quickly back across the existing path 920 before the printing is slowed back down to the original speed at the final strand segment 916. The interference between preexisting support material and the new path formed by strand segments (912-914-916) when printed creates a wiping action that secures the end of the low-speed print line (e.g., a lattice strut) to the existing line. In one embodiment, the internal structure is a lattice printed at low speeds to form relatively thicker struts and the attachment to the sidewall strand segment 900 is printed at higher speed to form a thin wiped connection. By decelerating at 916, the accumulated material volume per path length is returned to its original value, anchoring the beginning of the new line by a similar wiping effect to the binding of the previous slow line. During these movements the E-rate (material/time) is held constant so the faster path movements are also much thinner strands. Left unsupported, very fine deposits tend to break or collapse. Instead, the high-speed and thus very thin portions of the printed strand segment 914 overlap supportive material such that they are anchored (or adhered) with minimal interference.

This technique takes advantage of the superior control (via custom G-code) of the speed and movement of a 3D printer extruder as compared to only the control of the rate of material deposition. The material E-rate, the amount of step across sidewall strand segment 900, and the movement speeds can be calibrated for the application. The wipe across printed path segment 914 is small enough that it does not interfere with subsequent layers but nonetheless remains anchored.

Another embodiment uses a wiping procedure to anchor the ends of lines instead of using very thin extrusions. The E-rate is paused (instead of constant) during the path as it moves from printed strand segment 912 onto sidewall strand segment 900 (or 914). Then the extrusion resumes its previous rate as it moves from printed strand segments sidewall strand segment 900 (or strand segments 914) to strand segments 916. This technique contributes to single-wall structural design since there is essentially no strut which could be considered an opportunity for dead zones or bypass. The following G-code is an example of this wiping procedure:

G1 Y104.3913 E6.0664
G1 X37.2000 E6.0707 F2080
G1 X50.8000 Y119.3312 E7.4849 F857; Ends strand segment marked as strand segment 912
G1 X50.8750 E7.4874 F1800; Initial portion of strand segment connecting strand segment 912 to strand segment 914
G1 X50.9500 E7.4892 F2518; Final portion of strand segment connecting strand segment 912 to strand segment 914
G1 Y123.0662 E7.4892; Strand segment 914, extrusion value indicates this is a wipe.

It is noted the E parameter in the above G-code reflects an E-rate setting.

Now referring to FIG. 10 as view from the top of a cassette, a loop-as-wipe structure 1000 attaches portions of an internal structure 1002 and 1006 with a includes a wipe portion 1004 disposed adjacent to a sidewall 1010. In addition to minimizing bypass and dead zones, the loop-as-wipe structure provides additional strength to the cassette in order to support higher operating pressures than can be achieved with conventional 3D printing. The internal geometry (1002-1006) is adhered to the integral outer wall in such a way that it does not interfere with integrity of subsequent outer wall strand segments (i.e. above in the Z direction). The internal geometry (1002-1006) is adhered to the integral outer wall in such a way that it does not interfere with integrity of subsequent outer walls. Wipe section 1012 show the placement of this feature on side wall 1010.

Distributors

A distributor is generally defined as a collection of multiple flow paths for some fluid/gas from one volume region (the source) to another volume region (the exit). The features of the paths are determined by the specific application/device.

Pinched Distributor

Figure 11A:
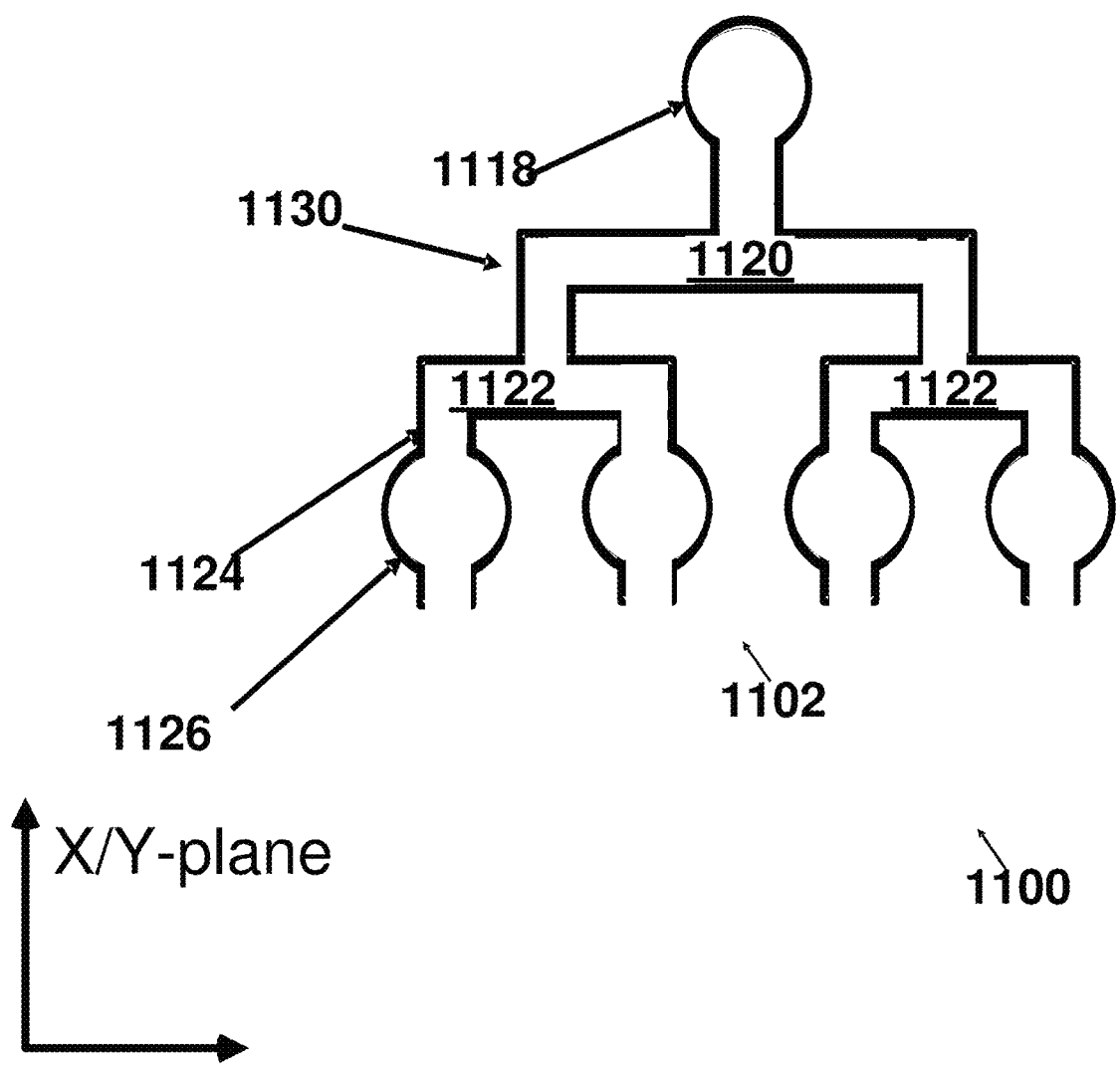
FIG. 11A is a schematic diagram of a cassette distributor (along section 11A-11A of FIG. 1B) of the lattice and distribution network for a stackable chromatography cassette of FIG. 1B.

FIG. 11A is a schematic diagram of a cassette distributor (along section 11A-11A) of the lattice and distribution network for a stackable chromatography cassette of FIG. 1B. Now referring to FIG. 11A, a lattice and distribution network 1100 includes a first internal distribution network 1102. Here a branched distributor is a multilevel isoflow distributor 1130 having distribution levels 1120 and 1122. The first internal distribution network 1102 more evenly distributes the feed stream through the lattice. The multilevel isoflow distributor 1130 includes the following advantages:

(1) Hold up volume of multilevel isoflow distributor 1130 is minimal.
(2) The pass through distribution passageways 1118 can have larger diameters and lower pressure drop (ΔP) without increasing holdup volume.
(3) The flow dispersion, especially important in chromatography, is evenly distributed as it flows from the source of the distributor to the end channel, or the reverse. This is achieved by every flow path being the same total length and cross sections (leading to uniform pressure drops/velocities in the different channels).

The second internal distribution network (not shown) is similar to the first internal distribution network on the opposite end of the lattice but flowing in the reverse direction.

FIGS. 11B, 12 and 13A-D are schematic diagrams of different features of a pinched distributor 1132 which is similar in function to the multilevel isoflow distributor 1130 of FIG. 11A. The pinched distributor defines multiple flow paths between a source and an exit while maintaining the advantages of good distribution demonstrated by the isoflow distributor in FIG. 11A.

Figure 11B:
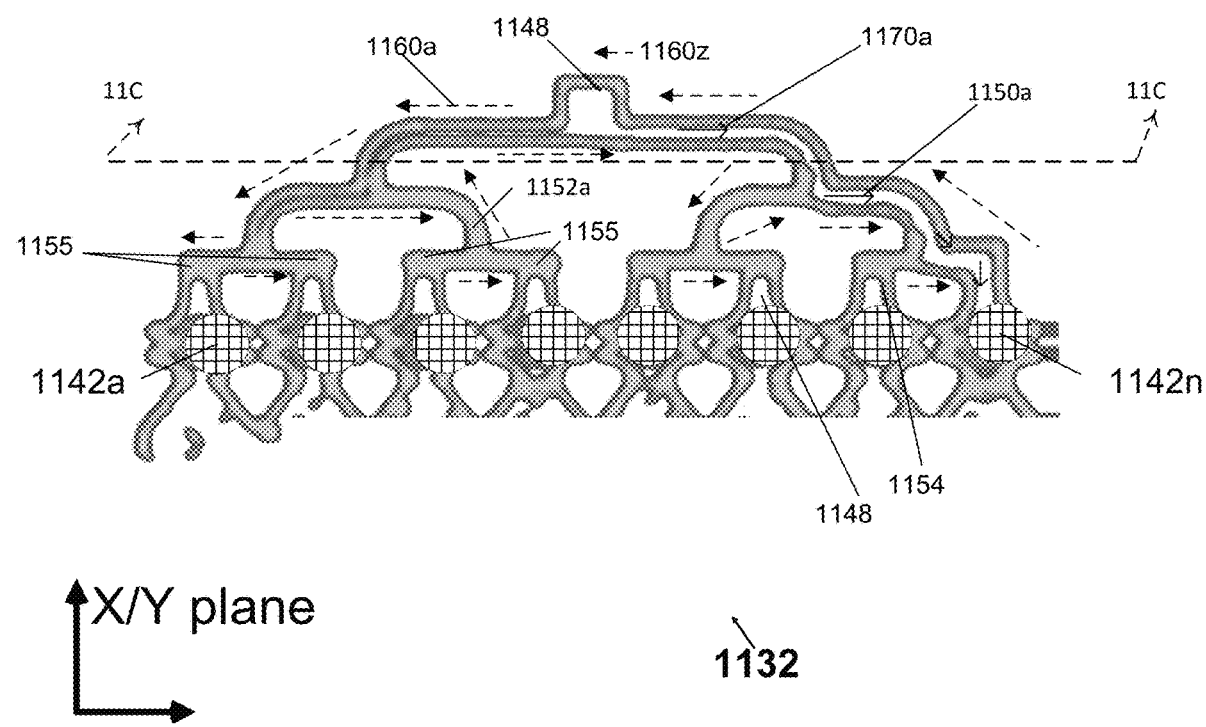
FIG. 11B is an annotated view of a CT scan of a pinched distributor similar to the distributor of FIG. 11A according to an aspect of the invention.

FIG. 11B is an annotated view of a CT scan (in an X/Y plane) of one layer (in the Z direction) of a pinched distributor 1132 similar to the multilevel isoflow distributor 1130 of FIG. 11A. In the particular Z layer shown the pinched distributor 1132 includes an open flow path 1150a, other possible flow paths are pinched off (e.g., flow path 1152a). The arrows 1160a partially show the path direction as it completes printing this example layer. In other Z layers the other distributor paths, such as 1152a, will be opened. Pinching all other flow paths closed while opening one flow path allows printing the distributor Z layer with a single strand having no interruptions in the print strand. The single strand strategy greatly increases the chance of having an integral flow path as described above in conjunction with the Single Strand Wall and Double Wedge techniques. The pinched distributor 1132 also includes a plurality of frits 1142a-1142n and Z distribution passageways 1148 and 1154. Distributor paths can be connected and disconnected from a bifurcation, for example at points 1155 in FIG. 11B. This is an important feature in building distributor networks. FIG. 13D below shows how this feature in more detail.

Figure 11C:
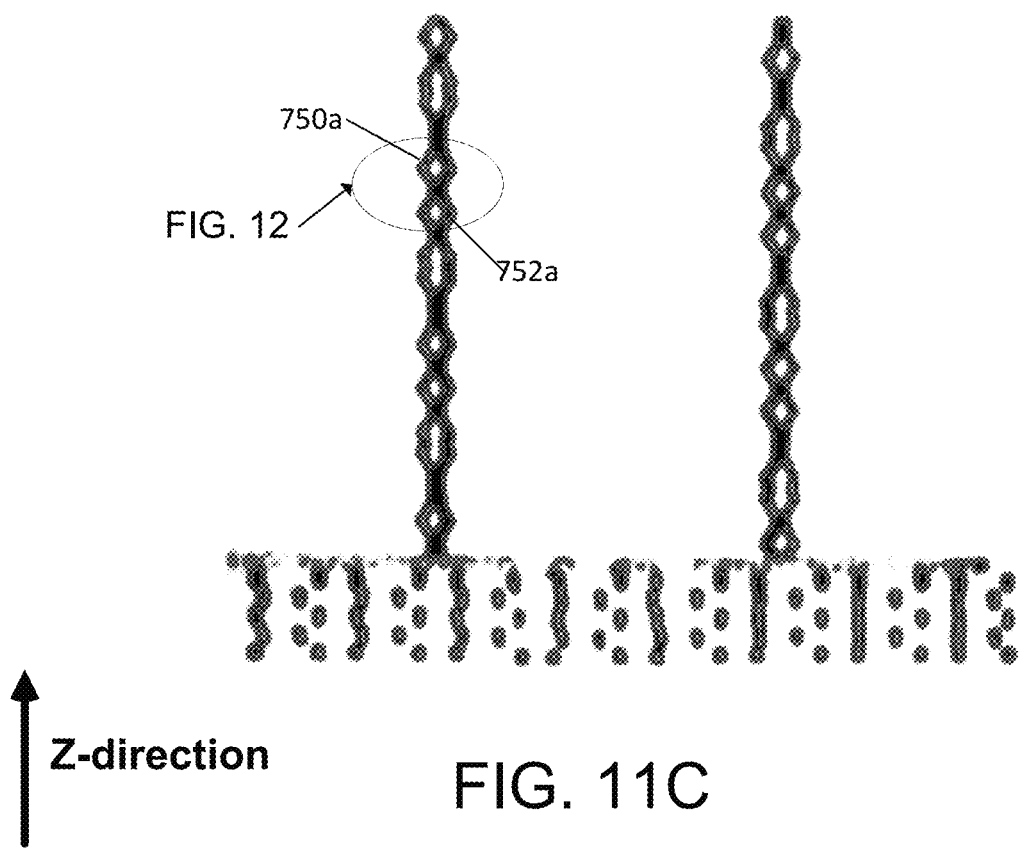
FIG. 11C is cross section view of a CT scan of the pinched distributor of FIG. 11B.

FIG. 11C is cross section view of a CT scan of the pinched distributor of FIG. 11B showing a flow distribution passageway which is described in further detail in conjunction with FIG. 12 below. 750a and 752a are two separate flow paths at different levels on the Z-axis. Flow direction out of the page.

Figure 12:
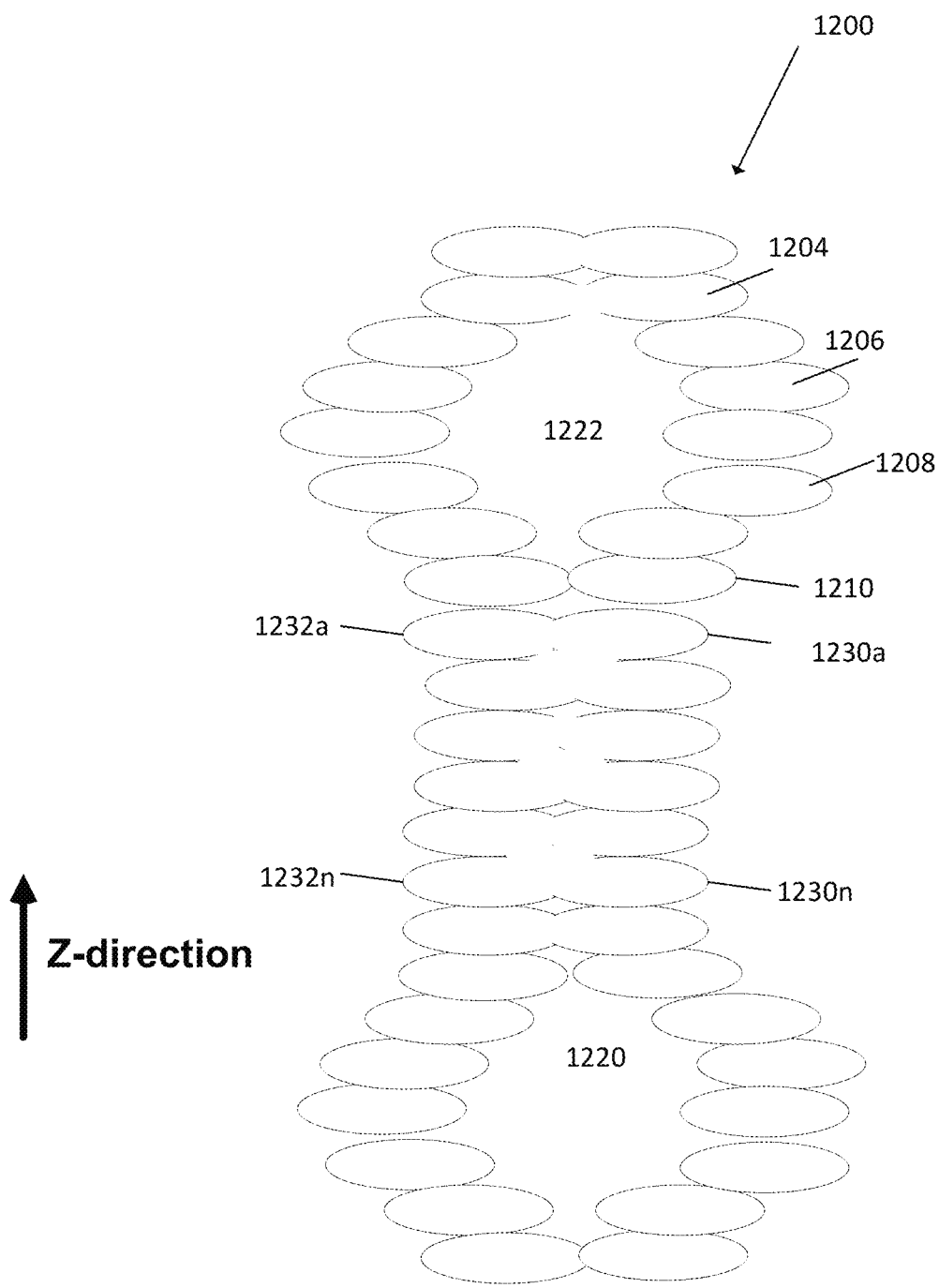
FIG. 12 is an exploded schematic diagram of a portion of the pinched distributor of FIG. 11C.

FIG. 12 is a schematic diagram which shows multiple features of the pinched distributor 1200. Each oval represents one strand segment cross section. 1220 and 1222 are flow paths contained by the strand segments and separated in the Z axis. Strand segment cross sections 1230a and 1232a are overlapping such that they fuse and form an integral seal. There can be any number of them up to 1230n to 1232n which separate flow paths in the Z axis. In an embodiment the strand segments in the same Z layer will be the same single strand. To open a flow path the strand segments will step away from each other a distance less than the strand width such as segments 1208-1210 (referred to as gutters 1208-1210). Gutters 1208-1210 form the bottom of a flow path. To close the flow path the strand segments step toward each other again each step is less than the strand width, as in layers 1204-1206 (referred to as gables 1204-1206). Gables 1204-1206 close a flow path. In this way flow paths can be opened and pinched closed along the Z axis. A number of layers can be printed between the gutters 1208-1210 and gables 1204-206 with strand segments spaced at the full flow path width.

Figure 13A:
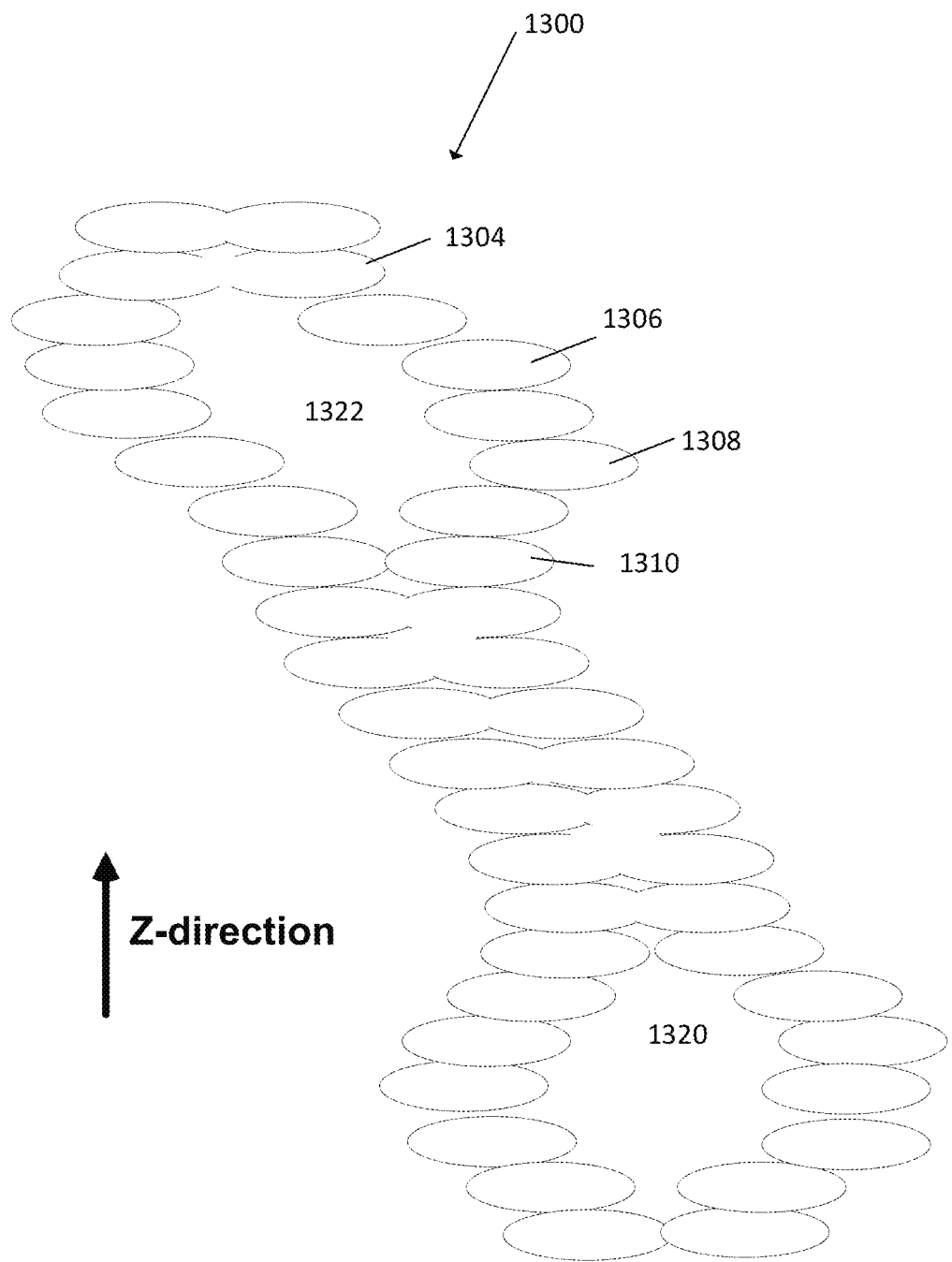

FIG. 13A illustrates how two flow paths similar to FIG. 12 that are not one directly above the other can be printed. Integrity and structural stability require that the adjustment of the print position is explicitly less than the width of printed strand, but is otherwise adjustable to conform as near as possible to the desired shape of the flow path.

Figure 13B:
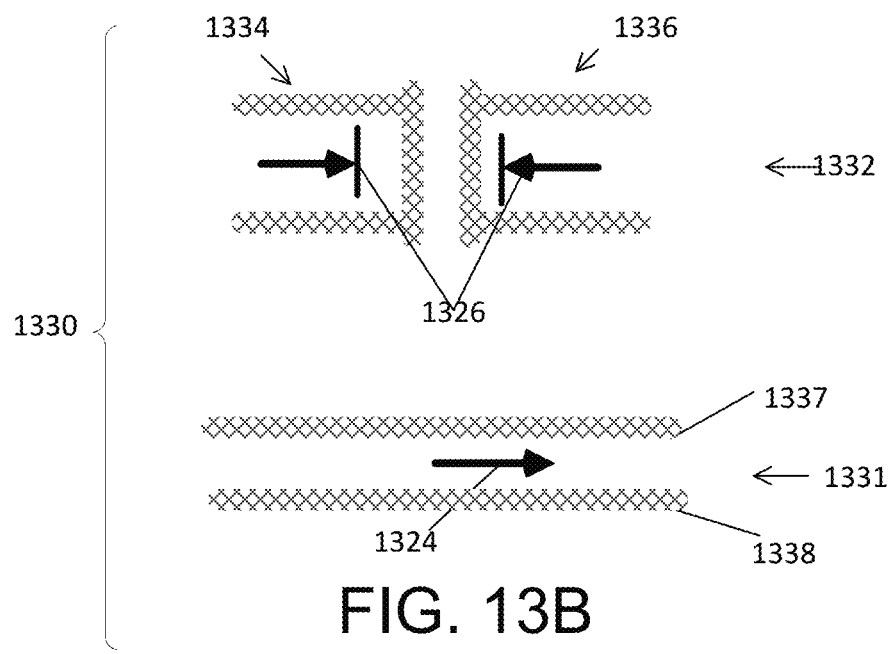

Now referring to FIG. 13B, a stack 1330 of two print layers of a pinched distributor are shown including base layer 1331 and upper layer 1332. The base layer includes strand segments 1337 and 1338 (which in one embodiment are both part of a single printed strand). Arrow 1324 indicates a fluid flow path contained by the strand segments. The upper layer 1332 includes printed strand segments 1334 and 1336 (which in one embodiment are both part of a single printed strand). Strand segments 1334 and 1336 bridge the distance between the two base strand segments and pinch closed the flow at the upper layer. The arrow 1326 indicates a closed flow path.

Figure 13C:
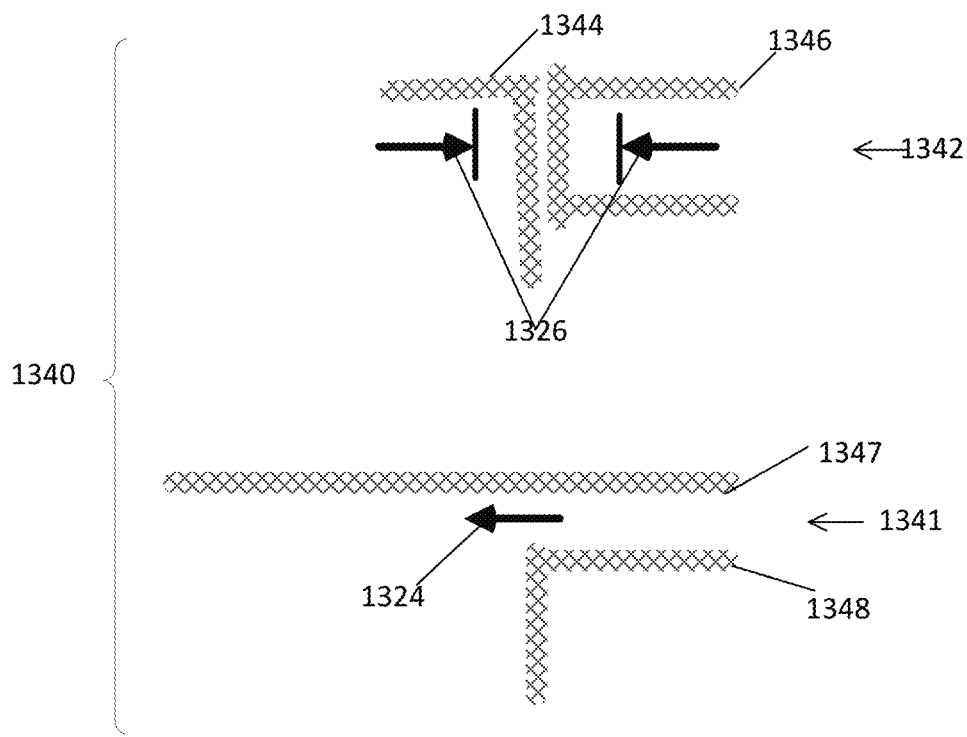

Now referring to FIG. 13C, a stack 1340 of two print layers of a pinched distributor are shown including base layer 1341 and upper layer 1342. The base layer includes strand segments 1347 and 1348 (which in one embodiment are both part of a single printed strand). Arrow 1324 indicates a fluid flow path contained by the strand segments. The upper layer 1342 includes printed strand segments 1344 and 1346 (which in one embodiment are both part of a single printed strand). Strand segments 1344 and 1346 bridge the distance between the two base strand segments and pinch closed the flow at the upper layer. The arrow 1326 indicates a closed flow path.

Now referring to FIG. 13D, a stack 1350 of two print layers of a pinched distributor are shown including base layer 1351 and upper layer 1352. The base layer includes strand segments 1357 and 1358 (which in one embodiment are both part of a single printed strand). Arrow 1326 indicates a fluid flow path contained by the strand segments. The upper layer 1352 includes printed strand segments 1353, 1354 and 1346 (which in one embodiment are part of a single printed strand). Strand segments 1354 and 1356 bridge the distance between the two base strand segments and pinch closed the flow at the upper layer. Arrow 1326 indicates a closed flow path.

FIGS. 13B-13D shows in detail how the pinched distributor from FIG. 11B and can open and close distributor path lines on the X-Y axis. In FIG. 13B strand segment 1337 and strand segment 1338 are parallel strand segments which form a flow path. In the layer directly above it the flow path has been terminated by strand segment 1336 crossing back over the flow path and following back along the top of strand segment 1338, likewise strand segment 1134 crosses back over the flow path and following back along the top of strand segment 1337. In one embodiment these can be the same strand to maintain loop integrity and therefore increase the chance to have good integrity on the fluid chamber with a single strand wall.

FIGS. 13C and 13D show variations on the pinched distributor feature. FIG. 13C shows a connection and closing off of a small channel to a larger one. The larger one may use the alternate methods described above for achieving integrity. Instead of having a gutter and gable structure it may be a larger volume with an impenetrable base and impenetrable roof. FIG. 13D shows how one channel can be connected and disconnected from a bifurcation, which is critical in building distributor networks as described in FIGS. 11A and 11B.

The structures shown in FIGS. 13A-13D require the printing of high-quality corners by the pinched distributor. This detail is illustrated in FIGS. 13E and 13F. Now referring to FIG. 13E, an idealized print corner segment 1360 is shown. FIG. 13F illustrates a diagram of an actual printed corner 1370 having a print path 1372. Print path 1372 includes adjustments for printing the corner 1374. This technique is used to compensate for the fact that the deposited filament is still connected to the print nozzle by the currently extruding filament, and thus when the nozzle turns a corner, it drags the deposited filament away from the corner by a small amount. The adjustment consists of two parts: first is the short segment 1371 in FIG. 13F, the second adjustment is that straight section print path 1372 is printed closer to the other wall than it normally would be (also shown in FIG. 13C).

While the desired shape of the print path may be a right angle, as in idealized print corner segment 1360, the actual path followed by the device depositing material will achieve that desired geometry by following an alternative path (printed corner 1370) which accounts for momentum, stiffness of the material and strand adherence to layer below. The move shown by 1372 is an example of an adjusted path, typical of what would be employed in FIGS. 13B-13D, which will achieve a right angle as shown in idealized print corner segment 1360.

These features in FIGS. 13B-13D in combination with the gutters and gables shown above can open and close distributors in the X, Y and Z directions. The gutters and gables shown in FIG. 12 allow flow paths to be opened and closed or printed separate and above one another in the Z axis. FIGS. 13B-13D show the pinching open or closed of flow paths within one Z layer (on the X-Y plane) such that various branching patterns can be constructed. These features allow the designer to achieve even fluid distribution along the X, Y and Z. The flow structures as embodied in FIGS. 12-13D are similar to the structure embodied in FIG. 11A. In keeping with principals of good distribution, and chromatographic performance, the distributor paths created using these methods can
 (1) Bifurcate or otherwise divide from a source to many branches
 (2) Have minimal hold up volume
 (3) Each path can be of equal length and cross section such that they have similar pressure drop/velocity profiles; and thus good chromatographic performance. Each path itself may change cross section but the distribution benefits from the paths matching each other.

Loop/surface integrity of a branching structure are accomplished by using this technique in combination with single strand walls and/or double wedge. These techniques provide good surface integrity when printing a great variety of branching structures that vary across multiple print layers.

Normally a branching structure with good fluid distribution properties like this could only be done by using many different strands which will have starts and breaks that could prevent good integrity. Other printing methods have trouble achieving the necessary surface integrity as long as they are constrained by having to use conventional slicers to generate G-code to drive a 3D printer.

The gutters 1208-1210 and gables 1204-1206 in FIG. 12 (and similarly in FIG. 13A) and pinching shown in FIGS. 13B-13D can be used independently to provide distribution in either only the Z axis or only the X-Y plane respectively. The gutters and gables use single strand walls that can, but don't need to, take advantage of the principals of loop integrity and the double wedge. They are shown above in a comprehensive application that combines techniques to get distribution along multiple axes with good integrity. The gutters and gables with single strand walls are especially applicable to creating low volume distribution along the Z axis of a printed fluidic device without the full pinched distributor.

It is understood that although the embodiments described herein relate specifically to bio-molecular applications, the principles, practice and designs described herein are also useful in other applications, including the manufacture of vaccines and biopharmaceuticals. All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. While the present invention has been described in conjunction with various embodiments and examples, it is not intended that the present teachings be limited to such embodiments or examples. On the contrary, the present invention encompasses various alternatives, modifications, and equivalents, as will be appreciated by those of skill in the art. While the teachings have been particularly shown and described with reference to specific illustrative embodiments, it should be understood that various changes in form and detail may be made without departing from the spirit and scope of the teachings. Therefore, all embodiments that come within the scope and spirit of the teachings, and equivalents thereto are claimed. The descriptions and diagrams of the methods of the present teachings should not be read as limited to the described order of elements unless stated to that effect.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

What is claimed is:

1. An additive manufacturing method for fabricating a device, the method comprising:
  printing an impermeable plate;
  printing a sidewall coupled to the impermeable plate; and
  printing a lattice and distribution network enclosed by the sidewall and the impermeable plate;
  wherein the impermeable plate comprises at least one of one of: an impermeable base and an impermeable roof;

attaching the lattice and distribution network to the sidewall
using a loop-as-wipe connection; and
wherein printing is extruded filament printing.

2. The method of claim 1, wherein printing an impermeable plate comprises:
printing a first layer having a first plurality of strand segments and a top surface;
wherein each of the first plurality of strand segments is spaced apart from an adjacent one of the first plurality of strand segments forming a plurality of gaps;
printing a second layer having a second plurality of strand segments, each of the second plurality of strand segments printed at least partially below the top surface of the first layer in a corresponding one of the plurality of gaps; and
wherein the second layer, at least partially seals the plurality of gaps.

3. The method of claim 1, wherein printing an sidewall comprises:
extruding a filament to form at least a portion of a loop of the fabricated device including a lower portion of a double wedge; and
extruding the filament to form at least a portion of a loop of the fabricated device including an upper portion of the double wedge aligned with the lower portion of the double wedge.

4. The method of claim 3, further comprising:
extruding the filament in a single-strand to prevent bypass and dead zones; and
sealing the sidewall using a hybrid process.

5. The method of claim 1, wherein attaching the lattice and distribution network to the sidewall comprises varying an extruder speed and E-rate.

6. The method of claim 1, wherein the lattice and distribution network includes a pinched distributor printed as a single strand per layer.

7. The method of claim 1 wherein the wherein the extruded filament printing is one of:
Fused Deposition Modeling (FDM) printing; and
Fused Filament Fabrication (FFF).

8. An additive manufacturing method for fabricating a device, the method comprising:
printing a sidewall comprising:
extruding a filament to form at least a portion of a loop of the fabricated device including a lower portion of a double wedge; and
extruding a filament to form at least a portion of a loop of the fabricated device including an upper portion of the double wedge aligned with the lower portion of the double wedge.

* * * * *